United States Patent
Nakano et al.

(10) Patent No.: US 7,009,389 B2
(45) Date of Patent: Mar. 7, 2006

(54) ROTATION ANGLE DETECTION DEVICE

(75) Inventors: Masatsugu Nakano, Tokyo (JP);
Yukari Toide, Tokyo (JP); Satoru Akutsu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/088,889

(22) Filed: Mar. 25, 2005

(65) Prior Publication Data

US 2005/0168217 A1 Aug. 4, 2005

Related U.S. Application Data

(62) Division of application No. 10/270,739, filed on Oct. 16, 2002, now Pat. No. 6,891,365.

(30) Foreign Application Priority Data

Oct. 16, 2001 (JP) ............................. 2001-317934
Jan. 24, 2002 (JP) ............................. 2002-015856

(51) Int. Cl.
*G01B 7/30* (2006.01)
*G01N 27/72* (2006.01)

(52) U.S. Cl. .................... 324/207.25; 324/207.16; 324/233

(58) Field of Classification Search .......... 324/207.17, 324/173–174, 207.22, 233, 207.16, 207.25; 310/171, 179
See application file for complete search history.

(56) References Cited

U.S. PATENT DOCUMENTS

| | | | |
|---|---|---|---|
| 4,743,786 A | 5/1988 | Ichikawa et al. | |
| 4,754,220 A * | 6/1988 | Shimizu et al. | 324/207.18 |
| 4,764,767 A | 8/1988 | Ichikawa et al. | |
| 5,256,923 A | 10/1993 | Bartos et al. | |
| 5,300,884 A | 4/1994 | Maestre | |
| 5,757,182 A | 5/1998 | Kitazawa | |

FOREIGN PATENT DOCUMENTS

| | | |
|---|---|---|
| DE | 69608879 T2 | 4/1996 |
| EP | 0 709 648 A2 | 5/1996 |
| JP | 49-124508 | 11/1974 |
| JP | 62-144022 | 6/1987 |
| JP | 62-58445 | 12/1987 |
| JP | 2698013 | 9/1997 |

* cited by examiner

*Primary Examiner*—Bot Ledynh
*Assistant Examiner*—Reena Aurora
(74) *Attorney, Agent, or Firm*—Sughrue Mion, PLLC

(57) ABSTRACT

A highly accurate rotation angle detection device is realized by correcting a detecting position error caused by a machining error such as deterioration of roundness of an internal diameter of a stator. The rotation angle detection device is provided with a stator (12), which is provided with an exciting winding of one phase and two-phase output windings, and a rotor (13) having salient poles, in which the stator (12) has a plurality of teeth (11), the two-phase output windings are wound around the plurality of teeth, and the plurality of teeth include teeth for which the number of turns of the output windings is N and at least one of teeth for which the number of turns of the output windings is N±m (it is assumed that N and m are positive integers and N>m) and teeth for which the number of turns is m.

12 Claims, 16 Drawing Sheets

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N | 0 | N+m | 0 | N | 0 | N+m | 0 |
| NUMBER OF TURNS OF OUTPUT WINDING 2 | 0 | N | m | N | 0 | N | m | N |

FIG. 5

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N±m | 0 | N | 0 | N±m | 0 | N | 0 |
| NUMBER OF TURNS OF OUTPUT WINDING 2 | 0 | N | 0 | N | 0 | N | 0 | N |

FIG. 6

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N | 0 | N | 0 | N | 0 | N | 0 |
| NUMBER OF TURNS OF OUTPUT WINDING 2 | 0 | N±m | 0 | N | 0 | N±m | 0 | N |

FIG. 7

| $\alpha 1$ | POSITIVE | 0 | NEGATIVE | 0 |
|---|---|---|---|---|
| $\alpha 1$ | 0 | POSITIVE | 0 | NEGATIVE |
| $\beta$ [ELECTRICAL ANGLE] | 0° | 90° | 180° | 270° |

FIG. 10

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N | 0 | N±m1 | 0 | N | 0 | N±m1 | 0 |
| NUMBER OF TURNS OF OUTPUT WINDING 2 | 0 | N±m2 | 0 | N | 0 | N±m2 | 0 | N |

FIG. 13

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N | 0 | N | 0 | N | 0 | N | 0 |
| NUMBER OF TURNS OF OUTPUT WINDING 2 | 0 | N+m | 0 | N+m | 0 | N | 0 | N |

FIG. 16

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N | 0 | N | 0 | N | 0 | N | 0 |
| NUMBER OF TURNS OF OUTPUT WINDING 2 | 0 | N−m | 0 | N−m | 0 | N−m | 0 | N−m |

FIG. 17

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N+m | 0 | N+m | 0 | N+m | 0 | N+m | 0 |
| NUMBER OF TURNS OF OUTPUT WINDING 2 | 0 | N | 0 | N | 0 | N | 0 | N |

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N | 0 | N | 0 | N | 0 | N | 0 |
| NUMBER OF TURNS OF OUTPUT WINDING 2 | 0 | N-m | 0 | N-m | 0 | N-m | 0 | N-m |

| TEETH NUMBER | 1 | 2 | 3 | 4 | 5 | 6 | 7 | 8 |
|---|---|---|---|---|---|---|---|---|
| NUMBER OF TURNS OF OUTPUT WINDING 1 | N | 0 | N | 0 | N | 0 | N | 0 |
| NUMBER OF TURNS OF OUTPUT WINDING 2 | 0 | N | 0 | N | 0 | N | 0 | N |

ROTATION ANGLE DETECTION DEVICE

This is a divisional of application Ser. No. 10/270,739 filed Oct. 16, 2002 now U.S. Pat. No. 6,891,365. The entire disclosure of the prior application Ser. No. 10/270,739 is considered part of the disclosure of the accompanying divisional application and is hereby incorporated by reference.

BACKGROUND OF THE INVENTION

1. Field of the Invention

The present invention relates to a rotation angle detection device and, in particular, to a rotation angle detection device consisting of a stator, which is provided with an excitation winding of one phase and excitation windings of two phases, and a rotor having salient poles.

2. Description of the Related Art

An optical encoder has been conventionally used as a rotation angle detection device. However, the optical encoder has a disadvantage that its operating temperature environment is limited and, at the same time, it is complicated in its structure and is expensive. On the other hand, a rotation angle detection device utilizing a change in permeance of a gap between a rotor and a stator is devised as a rotation angle detection device that is simple in its structure and inexpensive and, at the same time, can stand even a high temperature environment. For example, an example of a rotation angle detection device having excitation windings of two phases and a one-phase output winding is described in JP 62-58445 B. In addition, an example of a rotation angle detection device having an excitation winding of one phase and two-phase output windings is described in JP 49-124508 A. In both of the conventional examples, since a rotor is formed to have salient poles, a phase or an amplitude of a voltage induced in an output winding changes depending on an angle of the rotor, and a position of the rotor can be found by reading the change. In addition, these conventional examples have a structure in which the number of turns of the output winding is the same in each tooth.

In these conventional examples, a rotation angle detection device having a small detecting position error and high accuracy is realized in an ideal case without a machining error. However, since a machining error actually occurs, a detecting position error may increase and desired accuracy may not be realized. For example, a detecting position error increases if roundness of an internal diameter of a rotor is deteriorated due to, for example, an error in arrangement of a winding or low accuracy of a mold used in punching out a core of the stator.

A rotation angle detection device with a shaft multiple angle of 2 is shown in FIG. 24 as a conventional example. More specifically, the conventional example of FIG. 24 corresponds to a rotation angle detection device in which the rotor described in JP 49-124508 A is formed to have two salient poles. In FIG. 24, reference numerals 100-1 and 100-2 denote two-phase output windings (hereinafter referred to as output winding (1) and output winding (2)). In addition, reference numeral 101 denotes teeth and 102 denotes a stator having eight teeth 101. Numerals 1 to 8 in the figure indicate teeth numbers. Reference numeral 103 denotes a rotor; 104, output windings with the number of turns N wound around the teeth 101; and 105, a rotation shaft of the rotor 103.

As shown in FIG. 24, the rotation angle detection device in this conventional example consists of the stator 102 having the eight teeth 101 and the rotor 103 having two salient poles and formed in a structure in which variation of permeance between the rotor and a gap surface pulsates and there is a double-crest pulsation component with a machine angle of 360 degrees. Although not shown in the figure, an excitation winding is concentrically wound around each tooth 101 on the stator 102 to have opposite polarities in the adjacent teeth 101. In addition, the two-phase output windings 100 is wound around the four teeth 101 (more specifically, the output winding (1) is wound around the teeth with the teeth numbers 1, 3, 5, and 7 and the output winding (2) are wound around the teeth with the teeth numbers 2, 4, 6 and 8) by the same number of turns N, respectively. However, polarities of the teeth are set to alternate. As shown in FIG. 24, the output winding (1) is wound around the teeth with the teeth numbers 1, 3, 5 and 7 such that polarities of the teeth alternate, that is, so as to have the same polarity in the teeth with the teeth numbers 1 and 5 and in the teeth with the teeth numbers 3 and 7 and have opposite polarities in the teeth with the teeth numbers 1 and 3. In addition, as shown in FIG. 24, the output winding (2) is wound around the teeth with the teeth numbers 2, 4, 6 and 8 such that polarities of the teeth alternate, that is, so as to have the same polarity in the teeth with the teeth numbers 2 and 6 and in the teeth with the teeth numbers 4 and 8 and have opposite polarities in the teeth with the teeth numbers 2 and 4. Further, these four windings 104 are connected in series. FIG. 25 shows the number of turns of the output winding in each tooth. In this way, in the conventional example shown in FIG. 24, the number of turns of the output winding is the same N in each tooth around which the output windings are wound. Then, a detecting position error is small and the rotation angle detection device operates as one with high accuracy in an ideal case without a machining error.

However, as already described, a detecting position error may increase and desired accuracy may not be realized because a machining error actually occurs. For example, a detecting position error may increase if roundness of an internal diameter of a stator deteriorates due to low accuracy of a mold used in punching out a core of the stator.

Increase in a detecting position error due to a machining error will be described citing a specific example. As an example, a case will be described in which a rotation angle detection device with an internal diameter of a stator of 20 mm and a shaft multiple angle of 2 is designed. Further, a winding specification is set to be the same as the aforementioned conventional example.

A case in which roundness of an internal diameter of a stator deteriorates and the internal diameter deforms into an elliptic shape will be considered. FIG. 31 shows detecting position errors in a case in which the internal diameter deforms deviating by 50 $\mu$m from a complete round shape and in an ideal state without a machining error and the shape of the internal diameter is a complete round. The horizontal axis indicates a position of a rotor in terms of a machine angle and the vertical axis indicates a detecting position error in terms of a machine angle. It is seen from this figure that a detecting position error increases as the internal diameter of the stator slightly deforms from a complete round shape. Moreover, it is also seen that a period of a detecting position error is a machine angle of 180 degrees, which is 360 degrees in terms of an electrical angle. However, an electrical angle is set to take a value obtained by multiplying a machine angle by a shaft multiple angle. In addition, a phase of this error with the period of the electrical angle of 360 degrees changes into various values depending on a machining error that has occurred.

Next, a case in which roundness of an internal diameter of a stator deteriorates and the internal diameter deforms into a square shape will be considered. FIG. 26 shows detecting position errors in a case in which the internal diameter deforms deviating by 20 μm from a complete round shape and in an ideal state without a machining error and the shape of the internal diameter is a complete round. The horizontal axis indicates a position of a rotor in terms of a machine angle and the vertical axis indicates a detecting position error in terms of a machine angle. It is seen from this figure that a detecting position error increases as the internal diameter of the stator slightly deforms from a complete round shape. Moreover, it is also seen that a period of a detecting position error is a machine angle of 90 degrees, which is 180 degrees in terms of an electrical angle. However, an electrical angle is set to take a value obtained by multiplying a machine angle by a shaft multiple angle. In addition, a phase of this error with the period of the electrical angle of 180 degrees changes into various values depending on a machining error that has occurred.

As described above, the conventional rotation angle detection device is designed to operate as a rotation angle detection device having a small detecting position error and high accuracy in an ideal case without a machining error. However, in reality, since a machining error inevitably occurs due to an error in arrangement of a winding, low accuracy of a mold used in punching out a core of the stator, or the like, a detecting position error may increase and desired accuracy may not be realized.

SUMMARY OF THE INVENTION

The present invention has been devised to solve such problems, and it is an object of the present invention to provide a rotation angle detection device consisting of a stator, which is provided with an exciting winding of one phase and two-phase output windings, and a rotor having salient poles, in which a detecting position error caused by a machining error is corrected by devising the number of turns of the output windings to realize high accuracy.

With the above object in view, the rotation angle detection device of the present invention includes: a stator, which is provided with an excitation winding of one phase and two-phase output windings; and a rotor having salient poles, in which the stator has a plurality of teeth and the two-phase output windings are wound around the plurality of teeth and in which the plurality of teeth include teeth for which the number of turns of the output windings is N and at least one of teeth for which the number of turns of the output windings is N±m (N and m are positive integers and N>m) and teeth for which the number of turns is m. Thus, with such a structure, since a detecting position error caused by a machining error such as deterioration of roundness of an internal diameter of the stator can be corrected, there is an effect that a rotation angle detection device with a small detecting position error, that is, high accuracy can be realized.

Other objects and features of the present invention will be apparent from the following descriptions taken in conjunction with the accompanying drawings, in which like reference characters designate the same or similar parts throughout the figures thereof.

BRIEF DESCRIPTION OF THE DRAWINGS

In the accompanying drawings:
FIG. 5 explains the winding specification of the rotation angle detection device in the second embodiment of the present invention in a table format;
FIG. 6 explains a modification of the winding specification of the rotation angle detection device in the second embodiment of the present invention in a table format;
FIG. 7 explains a relationship between a combination of direct current components α1 and α2 of a change in voltages of two-phase output windings and a phase of a detecting position error □ intentionally generated in the second embodiment of the present invention in a table format;
FIG. 10 explains the winding specification of the rotation angle detection device in the third embodiment of the present invention in a table format;
FIG. 13 explains the winding specification of the rotation angle detection device in the fourth embodiment of the present invention in a table format;
FIG. 16 explains the winding specification of the rotation angle detection device in the fifth embodiment of the present invention in a table format;
FIG. 17 explains a modification of the winding specification of the rotation angle detection device in the fifth embodiment in a table format.

DETAILED DESCRIPTION OF THE PREFERRED EMBODIMENTS

Preferred embodiments of the present invention will be hereinafter described with reference to the accompanying drawings.

First Embodiment

Figures 1, 2:
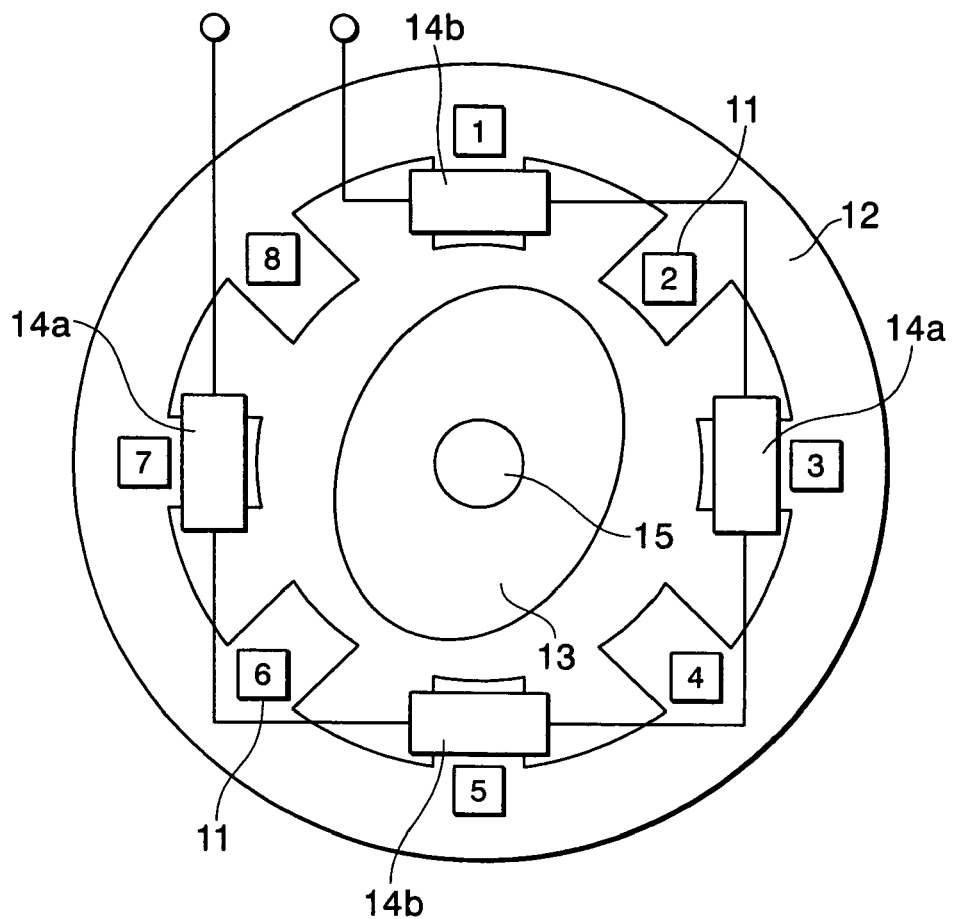
FIG. 1 is a diagram showing a winding specification of a rotation angle detection device in a first embodiment of the present invention.
FIG. 2 explains the winding specification of the rotation angle detection device in the first embodiment in a table format.

FIG. 1 is a diagram showing a structure of a rotation angle detection device in this embodiment. In FIG. 1, reference numeral 11 denotes teeth and 12 denotes a stator having eight teeth 11. Numerals 1 to 8 in the figure indicate teeth numbers of the teeth 11. Reference numeral 13 denotes a rotor and 14a and 14b denote output windings wound around the teeth 11. The number of turns is N±m for the output winding 14a (output winding wound around the teeth with the teeth numbers 3 and 7) and N for the output winding 14b (output winding wound around the teeth with the teeth numbers 1 and 5). In addition, reference numeral 15 denotes a rotation shaft of the rotor 13. Further, in this embodiment, although output windings are actually provided in two phases, only that for one phase (only the output winding ((1)) is shown in FIG. 1. FIG. 2 shows the number of turns of the output windings in each tooth. The number of turns for the output winding (1) is as described above (however, only N+m is written and N−m is omitted for the teeth with the teeth numbers 3 and 7). In the output winding (2), the number of turns of the output windings wound around the teeth with the teeth numbers 2, 4, 6 and 8 is N and the number of turns of the output windings wound around the teeth with the teeth numbers 3 and 7 is m.

Figures 24, 25:
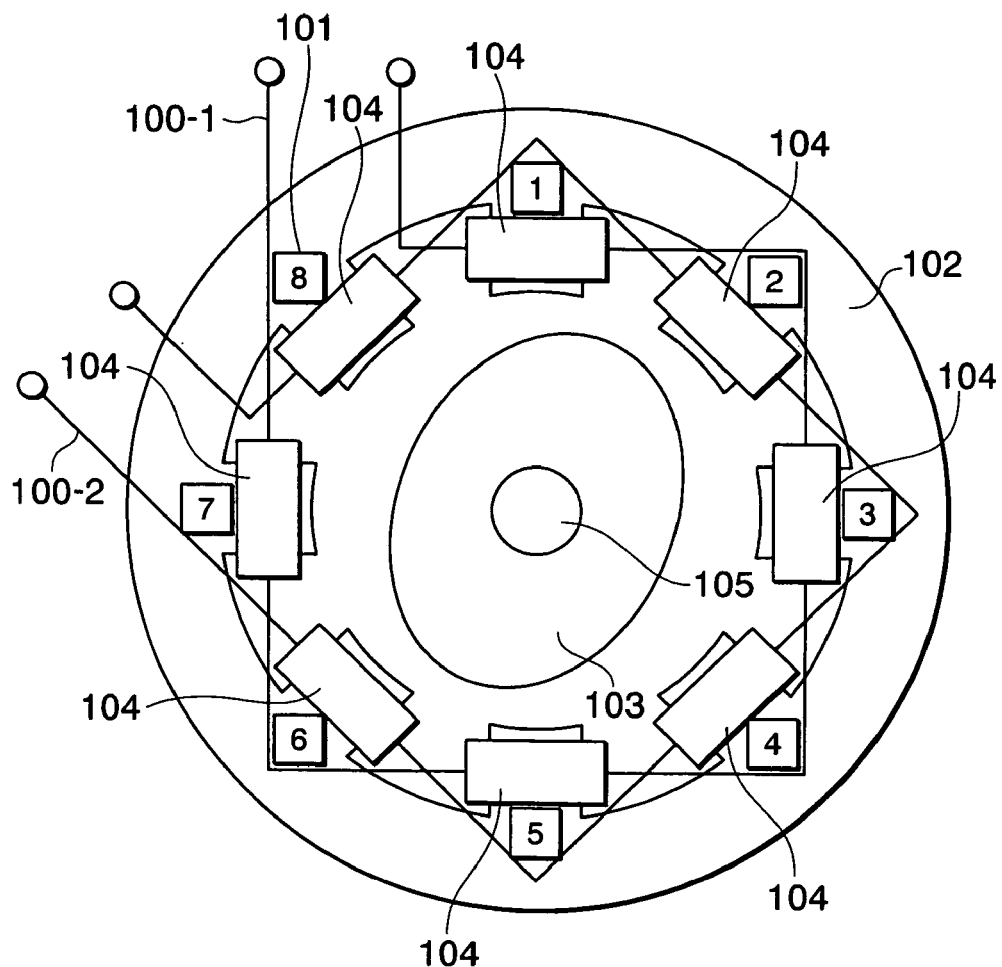
FIG. 24 is a diagram showing a winding specification of a conventional rotation angle detection device.
FIG. 25 explains the winding specification of the conventional rotation angle detection device in a table format.
Figure 31:
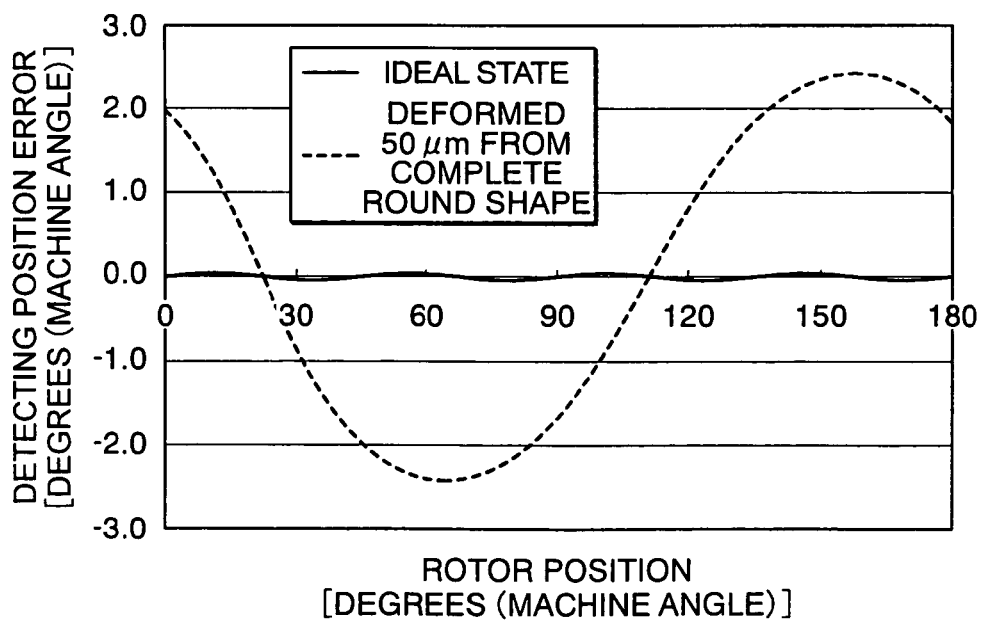
FIG. 31 explains a change in a detecting position error in the case in which an internal diameter of a winding of a stator deforms into an elliptic shape to deviate from a complete round shape by 50 μm.

As described using the conventional example of FIG. 24 and as shown in the above-mentioned graph of FIG. 31, a period of a detecting position error is a machine angle of 180 degrees, which is 360 degrees in terms of an electrical angle. However, an electrical angle is set to take a value obtained by multiplying a machine angle by a shaft multiple angle. In addition, a phase of this error with the period of the electrical angle of 360 degrees changes into various values depending on a machining error that has occurred.

Judging from the above, it is assumed that a detecting position error caused by a machining error of a shape of a stator can be reduced and a highly accurate rotation angle detection device can be realized if a specification of output windings is devised from the conventional example shown in FIG. 24 and changed such that an error with the period of the electrical angle of 360 degrees can be corrected. In addition, if such an error occurs due to accuracy of a mold for punching out a core of a stator, a detecting position error of a similar tendency would occur as long as the same mold is used, and a possibility that a winding specification for correcting an error has to be changed in respective rotation angle detection devices even at the time of mass production would be low.

Figure 27:
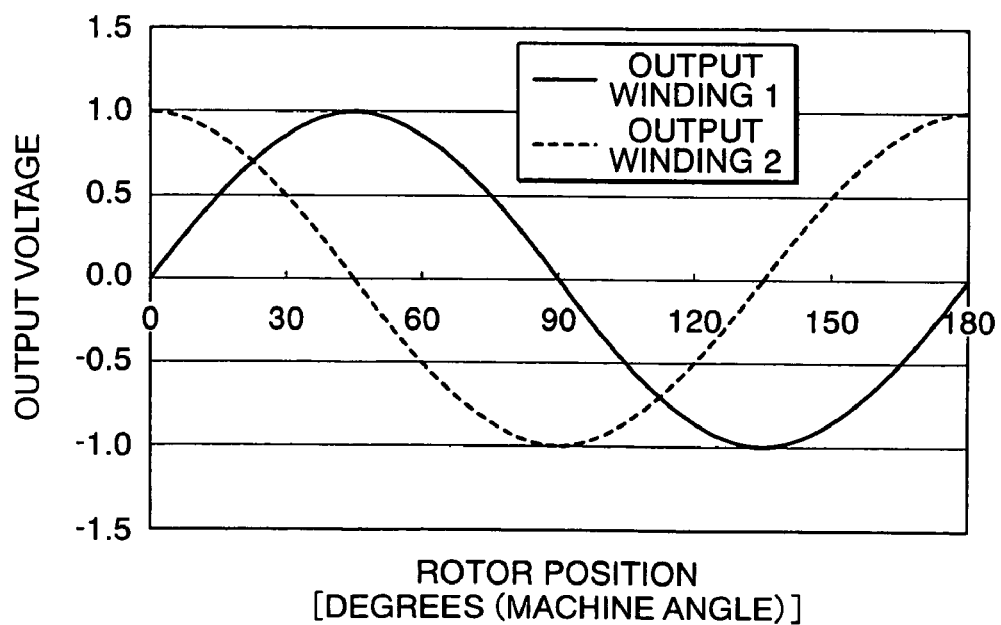
FIG. 27 explains changes in voltages of two-phase output windings (in the case in which a shaft multiple angle is 2) by a graph.

Thus, a method of intentionally generating an error with the period of the electrical angle of 360 degrees by devising output windings will be considered. As a first step of the consideration, a cause of an error with the period of the electrical angle of 360 degrees will be examined. In the rotation angle detection device with the above-mentioned structure, as a position of a rotor is changed while applying an alternating current to an excitation winding, a voltage generated in the two-phase output windings changes in a sine wave shape, and its changing phases deviate by an electrical angle of 90 degrees in the two-phase output windings from each other. Therefore, when an amplitude of the voltage generated in the two-phase output windings is plotted in each rotor position, a graph as shown in FIG. 27 can be obtained. However, a negative amplitude of a voltage of an output winding means that a phase is reversed from the time when an amplitude is positive. In this way, if the voltage generated in the output winding ideally changes in a sine wave shape with respect to a rotation angle, when its amplitude is set to be e1 and e2 in the two-phase output windings, the output windings (1) and (2), respectively, and a rotation angle (machine angle) of the rotor is set to be ψ [rad], since the rotation angle detection device with the above-mentioned structure has a shaft multiple angle of 2, e1 and e2 can be represented as follows:

$$e_1(\phi) = \sin 2\phi \quad (1)$$

$$e_2(\phi) = \cos 2\phi \quad (2)$$

However, an amplitude of a voltage is standardized with a maximum value as one. The waveform of FIG. 27 is ideally a sine wave but it contains a harmonic component. When amplitudes of voltages of two-phase output windings in the case in which qth harmonic of an amplitude αq is included in a change of an amplitude of an output voltage are set to be e1' and e2', e1' and e2' can be represented as follows:

$$e_1'(\phi) = \sin 2\phi + \alpha_q \sin 2q\phi \quad (3)$$

$$e_2'(\phi) = \cos 2\phi + \alpha_q \cos 2q\phi \quad (4)$$

Here, assuming that $$2\varphi = \tan^{-1} \frac{e_1(\varphi)}{e_2(\varphi)} \quad (5)$$

-continued $$2\varphi' = \tan^{-1}\frac{e'_1(\varphi)}{e'_2(\varphi)} \quad (6)$$

a detecting position error ε [rad] (electrical angle) is found as follows from Expressions (1) to (6):

$$\tan\varepsilon = \tan(2\varphi - 2\varphi') \quad (7)$$

$$= \frac{\tan 2\varphi - \tan 2\varphi'}{1 + \tan 2\varphi \tan 2\varphi'}$$

$$= \frac{\dfrac{\sin 2\varphi}{\cos 2\varphi} - \dfrac{\sin 2\varphi + \alpha_q \sin 2q\varphi}{\cos 2\varphi + \alpha_q \cos 2q\varphi}}{1 + \dfrac{\sin 2\varphi}{\cos 2\varphi}\dfrac{\sin 2\varphi + \alpha_q \sin 2q\varphi}{\cos 2\varphi + \alpha_q \cos 2q\varphi}}$$

$$= \frac{\alpha_q \sin 2\varphi(1-q)}{1 + \alpha_q \cos 2\varphi(1-q)}$$

If $\alpha_q \ll 1$, Expression (7) can be approximated as in the following expression:

$$\tan\varepsilon \approx \alpha_q \sin 2\phi(1-q) \quad (8)$$

In addition, if ε is sufficiently small, the following expression is established:

$$\tan\varepsilon \approx \varepsilon$$

Thus, the detecting position error ε is obtained as follows:

$$\varepsilon \approx \alpha_q \sin 2\phi(1-q) \quad (9)$$

From the above description, a relationship between a harmonic component contained in a voltage change of an output winding and a period of a detecting position error is clarified.

It is seen from Expression (9) that, when q=0, that is, when a direct current component is contained in a voltage change of an output winding, an error of period of a machine angle of 180 degrees (period of an electrical angle of 360 degrees) occurs. Therefore, it is assumed that if a winding specification for intentionally containing a direct current component in a voltage change of an output winding is used, a detecting position error with the period of the electrical angle of 360 degrees can be generated and, if a phase is set appropriately, an error due to a machining error can be corrected to reduce a detecting position error and realize a highly accurate rotation angle detection apparatus. However, it should be noted that a direct current component referred to herein is a direct current component in the graph of FIG. 27 and indicates a component at which an amplitude and a phase of an output voltage are constant without depending on a position of a rotor.

Figure 30:
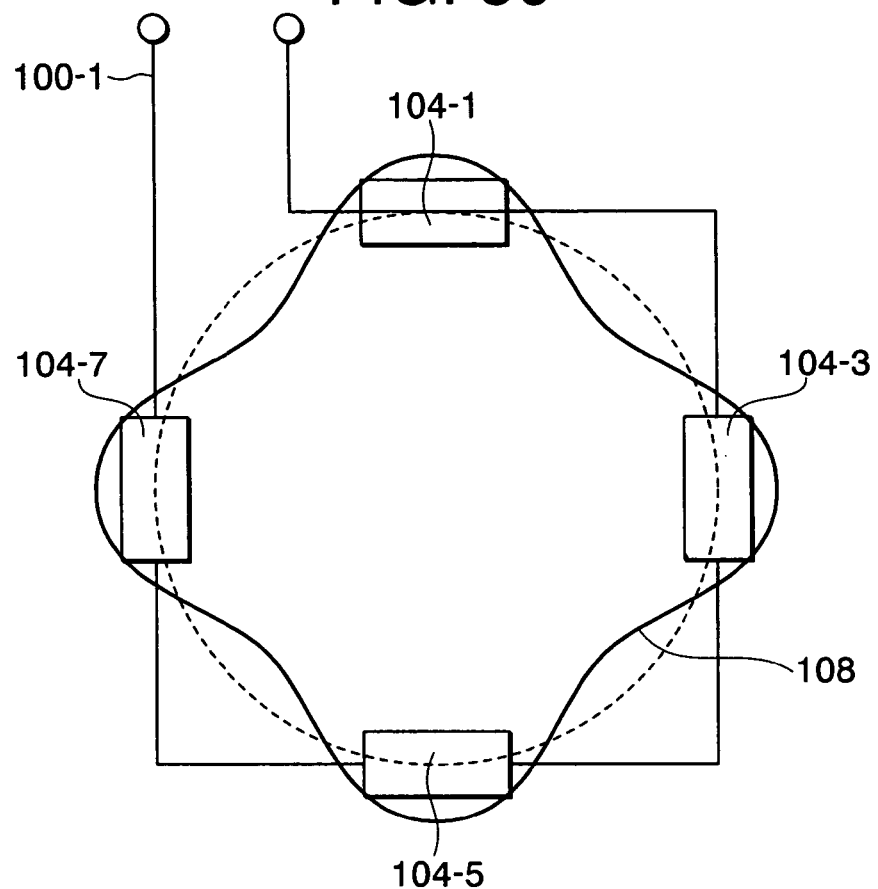
FIG. 30 explains how a magnetic flux of the spatial fourth order links with output windings.

Next, a method of intentionally containing a direct current component in a voltage change of an output winding will be considered. In the rotation angle detection device with a shaft multiple angle of 2 of the above-mentioned structure, an excitation winding is concentrically wound around each tooth to have opposite polarities in adjacent teeth. Thus, a magnetomotive force generated by an electric current flowing to the excitation winding becomes a component of eight poles, that is, a spatial fourth order component. On the other hand, a rotor includes two salient poles and has a spatial second order component as a component of permeance pulsation. Therefore, it can be considered that a spatial order of a magnetic flux generated in a gap has components of a sum and a difference of the order of the magnetomotive force and the order of the permeance, that is, 4+2=6 and 4−2=2 as a main component and, moreover, also includes a large quantity of the component that is the same as the magnetomotive force generated by the electric current of the excitation winding, that is the spatial fourth order component. The components of the sum and the difference of the order of the magnetomotive force and the order of the permeance, that is, the spatial second order component and the spatial sixth order component in this context change according to a position of the rotor. The output winding operates as the rotation angle detection device by picking up the change in the magnetic flux. On the other hand, the same component as the magnetomotive force generated by the electric current of the excitation winding, that is, the spatial fourth order component hardly changes according to a position of the rotor and remains substantially constant. In addition, in a winding specification of the output winding of the conventional example shown in FIG. 25, it can be understood from FIG. 30 that this change in the magnetic flux of the special fourth order component is not picked up. FIG. 30 schematically represents output windings 104-1, 104-3, 104-5 and 104-7 (hereinafter referred to collectively as output windings 104) and a magnetic flux 108 of the spatial fourth order of the conventional example. It can be understood that each tooth 101 around which the output windings 104 are wound has a structure in which the number of turns is the same N and polarities alternate, and a sum of flux linkages of the four teeth 101 becomes zero. However, if the number of turns of each tooth 101 is slightly changed or if a winding of a small number of turns is applied to an adjacent tooth 101 around which the winding 104 is not wound, a magnetic flux 106 of a spatial fourth order component order can be picked up and this magnetic flux 108 does not change according to a position of the rotor 103. Thus, as a result, it becomes possible to include a direct current component in a voltage change of the output windings 104. That is, if the rotation angle detection device has the teeth 101 for which the number of turns of the output windings 104 is N and is constituted by one or both of the teeth 101 for which the number of turns is N±m (it is assumed that N and m are positive integers and N>m) and the teeth 101 for which the number of turns is m, it becomes possible to include a direct current component in a voltage change of the output windings 104, and a detecting position error of a period of an electrical angle of 360 degrees can be generated intentionally. If this error corrects a detection position error due to a machining error, the detecting position error can be reduced and a highly accurate rotation angle detection device can be realized.

Figure 3:
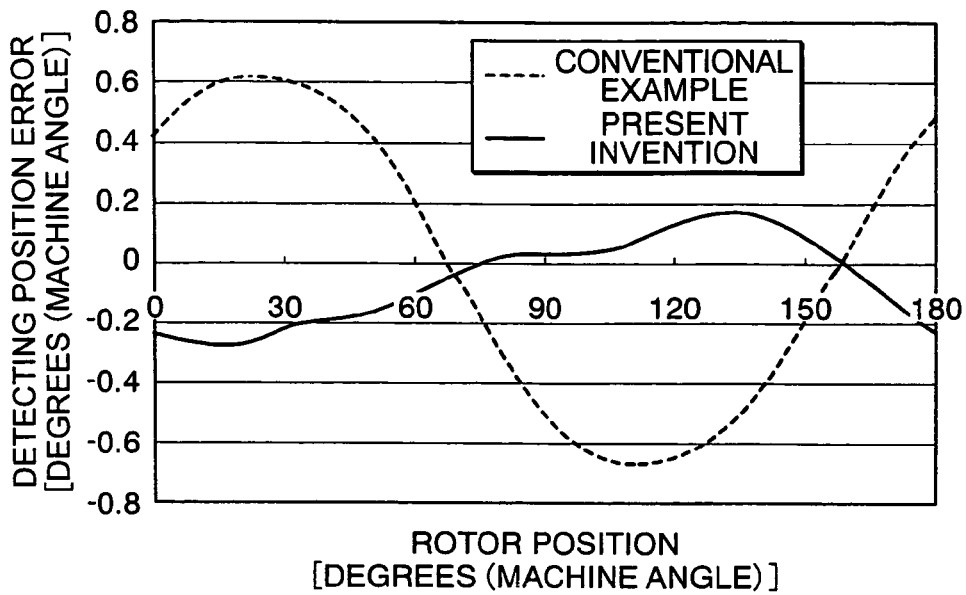
FIG. 3 explains comparison of detecting position errors in a conventional example and the first embodiment of the present invention by a graph.

Thus, this embodiment has the structure of the winding specification shown in FIGS. 1 and 2. Here, N=158 and m=1. FIG. 3 shows waveforms of detecting position errors. In FIG. 3, a waveform of a detecting position error at the time of the conventional winding specification of FIG. 24 (broken line of the figure) and a waveform in the case of the winding specification of FIG. 1 (solid line of the figure) are shown. With the winding specification of the conventional example, a detecting position error is small as already shown by the solid line of FIG. 31 and sufficient accuracy is obtained in an ideal state. However, an error of a machine angle of 180 degrees, that is, an electrical angle of 360 degrees is actually observed. With the winding specification of the present invention, this error is reduced and a highly accurate rotation angle detection device can be realized.

The example of the rotation angle detection device is shown here which is constituted by both the teeth for which the number of turns is N±m (it is assumed that N and m are positive integers and N>m) and the teeth for which the number of turns is m. However, even if the rotation angle detection device is constituted by one of the teeth, an error of an electrical angle of 360 degrees can be generated intentionally as already described. Consequently, an error of an electrical angle of 360 degrees caused by a machining error can be corrected. In addition, although the rotation angle detection device with a shaft multiple angle of 2 is described in this embodiment, the same description can be applied to those with a shaft multiple angle of 1 or 3 or more.

As described above, in a rotation angle detection device consisting of a stator, which is provided with an excitation winding of one phase and two-phase output windings, and a rotor having salient poles, the rotation angle detection device has the structure in which the two-phase output windings is wound around a plurality of teeth of the stator and teeth for which the number of turns of an output winding is N is provided, and is constituted by one or both of teeth for which the number of turns is N±m (it is assumed that N and m are positive integers and N>m) and teeth for which the number of turns is m. Thus, there is an effect that a detecting position error caused by a machining error can be reduced and a highly accurate rotation angle detection device can be realized.

Second Embodiment

In the first embodiment, a method of changing the number of an output winding from that of the conventional example of FIG. 24, thereby correcting a detecting position error caused by a machining error is described. A winding specification is devised and a direct current component is included in a voltage change of an output winding, whereby a winding for intentionally generating a detecting position error of an electrical angle of 360 degrees is made to correct an error caused by a machining error.

In this embodiment, it will be described that a rotation angle detection device is constituted such that output windings are wound around a plurality of teeth of a stator, and a certain one-phase output winding is wound to have the number of turns in each tooth of N±m, 0, N and 0 (it is assumed that N and m are positive integers and N>m) or to repeat this pattern of the number of turns and another one-phase output winding is wound to have the number of turns in each tooth of 0, N, 0 and N or to repeat this pattern of the number of turns, whereby a phase and an amplitude of an error generated intentionally can be controlled to some extent and a detecting position error can be reduced more efficiently. Further, an example of a rotation angle detection device with a shaft multiple angle of 2 will be considered as in the first embodiment.

Figure 4:
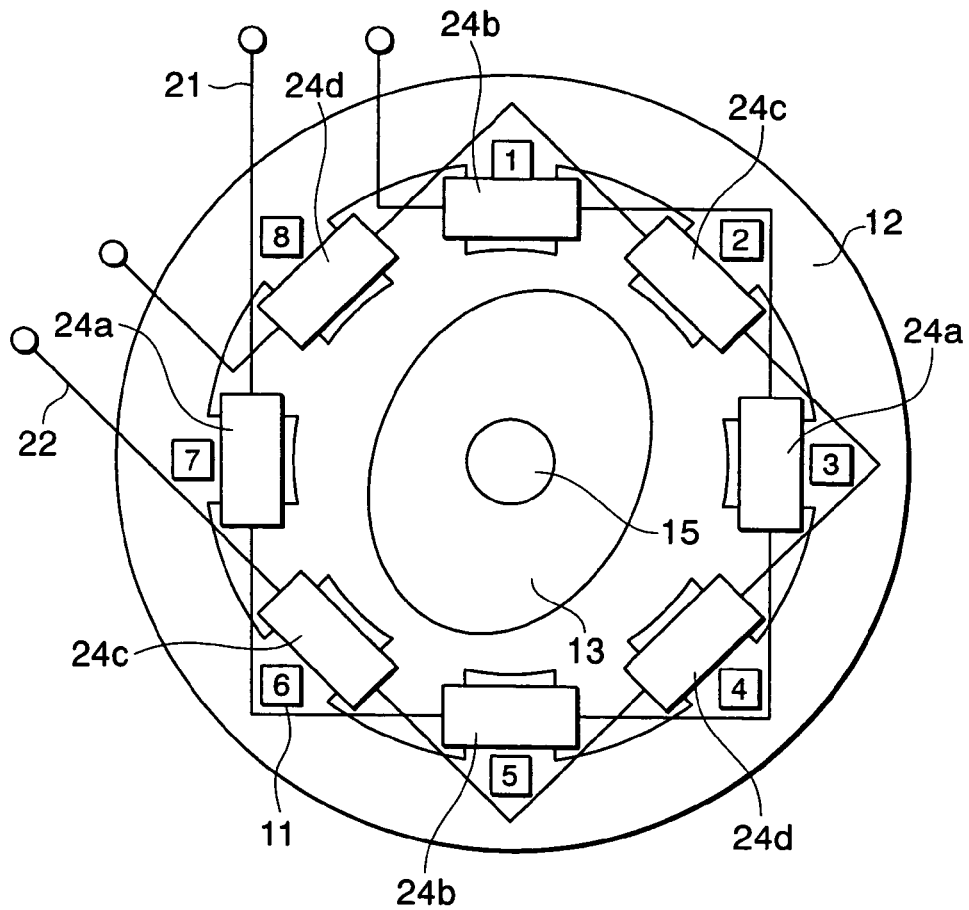
FIG. 4 is a diagram showing a winding specification of a rotation angle detection device in a second embodiment of the present invention.

FIG. 4 is a diagram showing a structure of the rotation angle detection device in this embodiment. In FIG. 4, reference numeral 11 denotes teeth and 12 denotes a stator having eight teeth 11. Numerals 1 to 8 in the figure indicate teeth numbers of the teeth 11. Reference numeral 13 denotes a rotor and 15 denotes a rotation shaft of the rotor 13. Reference numerals 24a, 24b, 24c and 24d are output windings wound around the teeth 11. The output windings 24a and 24b belong to an output winding (1) (denoted by reference numeral 21 in the figure) and the output windings 24c and 24d belong to an output winding (2) (denoted by reference numeral 22 in the figure). In the output winding (1), the number of turns of the output winding 24a (output winding wound around the teeth with the teeth numbers 3 and 7) is N and the number of turns of the output winding 24b (output winding wound around the teeth with the teeth numbers 1 and 5) is N±m. In addition, in the output winding (2), the numbers of turns of both the output winding 24c (output winding wound around the teeth with the teeth numbers 2 and 6) and the output winding 24d (output winding wound around the teeth with the teeth numbers 4 and 8) are N. FIG. 5 shows the number of turns of the output winding in each tooth of FIG. 4.

In the first embodiment, it is described that it becomes possible to pick up a magnetic flux of the spatial fourth order and a direct current component can be added to a change in a voltage of the output winding to intentionally generate an error of an electrical angle of 360 degrees by changing the number of turns of the output winding of each tooth. Thus, changes in an amplitude of a voltage of each output winding according to a position of the rotor (standardized value) is calculated as follows, respectively:

$$e_1'(\phi) = \sin 2\phi + \alpha_1 \tag{10}$$

$$e_2'(\phi) = \cos 2\phi + \alpha_2 \tag{11}$$

Here, $\alpha_1$ and $\alpha_2$ are direct current components of voltage changes of the output winding (1) and the output winding (2), respectively, and absolute values of them are sufficiently smaller than 1. When a detecting position error $\epsilon$ [rad] (electrical angle) is found as described in the first embodiment, it can be approximated as follows:

$$\begin{aligned}\varepsilon &\approx \tan(2\varphi - 2\varphi') \\ &= \frac{\tan 2\varphi - \tan 2\varphi'}{1 + \tan 2\varphi \tan 2\varphi'} \\ &= \frac{\alpha_1 \cos 2\varphi - \alpha_2 \sin 2\varphi}{1 + \alpha_2 \cos 2\varphi + \alpha_1 \sin 2\varphi} \\ &\approx \alpha_1 \cos 2\varphi - \alpha_2 \sin 2\varphi \\ &= \sqrt{\alpha_1^2 + \alpha_2^2} \cos(2\varphi + \beta)\end{aligned} \tag{12}$$

provided that, $$\cos\beta = \frac{\alpha_1}{\sqrt{\alpha_1^2 + \alpha_2^2}}, \quad \sin\beta = \frac{\alpha_2}{\sqrt{\alpha_1^2 + \alpha_2^2}} \tag{13}$$

From Expressions (12) and (13), it is considered that an error can be reduced efficiently by setting $\alpha_1$ and $\alpha_2$ appropriately.

The output windings of this embodiment will be described with reference to FIGS. 4 and 5. Note that, although an excitation winding is not shown in the figures, it is actually wound around each tooth concentrically to have opposite polarities in adjacent teeth as in the first embodiment. As described above, the number of turns of the output winding (1) 21 is N±m, 0, N, 0, N±m, 0, N and 0 in the order of the teeth numbers 1, 2, 3, 4, 5, 6, 7 and 8, and the number of turns of the output winding (2) 22 is 0, N, 0, N, 0, N, 0 and N in the order of the teeth numbers 1, 2, 3, 4, 5, 6, 7 and 8. In addition, as described in the first embodiment, polarities of the windings alternate. The output winding (1) 21 is wound around to have the same polarity in the teeth with the teeth numbers 1 and 5 and in the teeth with the teeth numbers 3 and 7 and have opposite polarities in the teeth with the teeth numbers 1 and 3. The output winding (2) 22 is wound around to have the same polarity in the teeth with the teeth numbers 2 and 6 and in the teeth with the teeth numbers 4 and 8 and have opposite polarities in the teeth with the teeth numbers 2 and 4.

Further, FIG. 5 represents in a table format the case in which the number of turns of the output winding (1) 21 is changed from that of the conventional example and the number of turns of the output winding (2) 22 is equivalent to that of the conventional example, that is, the winding specification of FIG. 4. FIG. 6 shows the contrary case, that is, the case in which the number of turns of the output winding (2) 22 is changed from that of the conventional example and the number of turns of the output winding (1) 21 is equivalent to that of the conventional example. However, in the output winding (1) 21 of FIG. 5, the double sign of the number of turns applies in the same order as written in the teeth numbers 1 and 5 and, in the output winding (2) 22 of FIG. 6, the double sign of the number of turns applies in the same order as written in the teeth numbers 2 and 6. By setting the number of turns in this way, it becomes possible to change $\alpha_1$ and $\alpha_2$ of Expression (12) to positive, negative and zero. This is because, if winding specifications of the output winding (1) 21 and the output winding (2) 22 are the same as those in the conventional example, $\alpha_1$ and $\alpha_2$ become zero and, if the teeth with the number of turns of N±m is included, the output winding picks up a spatial fourth order component as already described and $\alpha_1$ and $\alpha_2$ are no longer zero, and their signs are reversed depending on whether the number of turns is set to N+m or N−m. Reversal of signs will be described more in detail. A phase of a flux linkage of a spatial fourth order component to be a direct current component appearing in an amplitude change of the output winding is reversed depending on whether the number of turns is set to N+m or N−m. The signs of $\alpha_1$ and $\alpha_2$ changes according to this reversal of the phase.

It has been found that $\alpha_1$ and $\alpha_2$ can be set to zero and signs of them can be changed by devising the winding specification as described above. More specifically, after making $\alpha_1$ zero by the winding of FIG. 5, $\alpha_1$ can be set to be positive or negative and, after making $\alpha_1$ zero, $\alpha_2$ can be set to be positive or negative. FIG. 7 shows combinations of $\alpha_1$ and $\alpha_2$ that are possible in this embodiment and □ of Expression (12), that is, phases of a detecting position error to be generated intentionally. It is seen from FIG. 7 that phases of a detecting position error can be set at an interval of an electrical angle of 90 degrees. In addition, it is seen that, since an amount of a magnetic flux of a spatial fourth order component picked up by the output windings can be adjusted by changing m, an amplitude of a detecting position error to be generated intentionally can also be controlled. However, if N is not larger than m, it is inappropriate because an amplitude of an error to be generated intentionally becomes too large. In addition, it is needless to mention that, even if the number of turns in the teeth with the teeth numbers 1 and 5 is changed to N and the number of turns in the teeth with the teeth numbers 3 and 7 is changed to N±m in the output winding (1) of FIG. 5 and the number of turns in the teeth with the teeth numbers 2 and 6 is changed to N and the number of turns in the teeth with the teeth numbers 4 and 8 is changed to N±m in the output winding (2) of FIG. 6, the output winding (1) and the output winding (2) are equivalent.

From the above consideration, an amplitude and a phase of a detecting position error caused by a machining error can be grasped, a detecting position error caused by a machining error can be corrected by selecting the appropriate number of turns, and a highly accurate rotation angle detection device can be realized.

Figure 8:
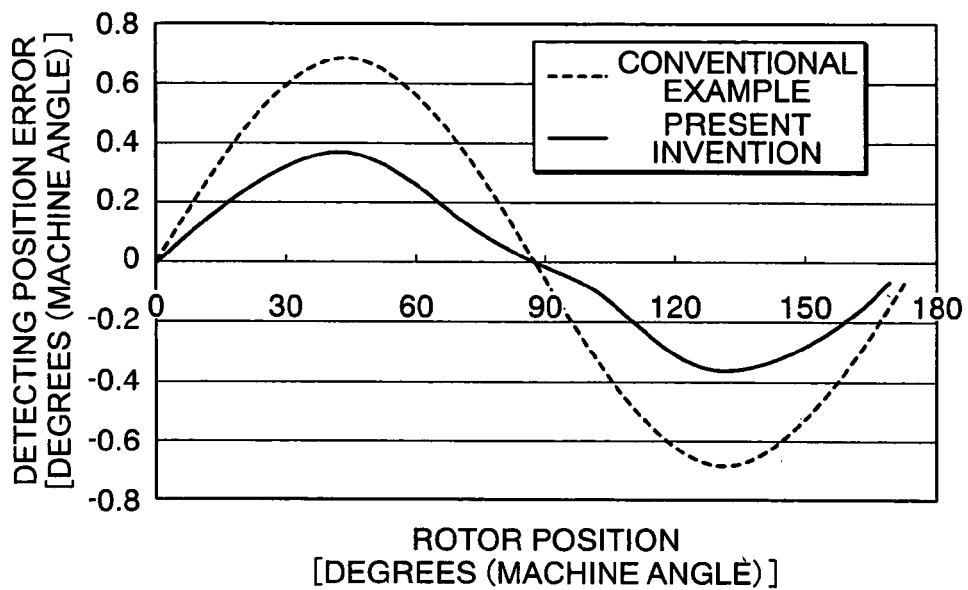
FIG. 8 explains comparison of detecting position errors in a conventional example and the second embodiment of the present invention by a graph.

As a specific example, FIG. 6 shows a winding specification in the case in which N=158 and m=2 and + is selected as a sign. FIG. 8 shows a detecting position error in the case in which roundness of an internal diameter of the stator deteriorates. The horizontal axis indicates a position of a rotor in terms of a machine angle and the vertical axis indicates a detecting position error in terms of a machine angle. As in the conventional example, if the number of turns of the output windings is set as in the conventional example (broken line in the figure), a detecting position error having a period of a machine angle of 180 degrees, that is, an electrical angle of 360 degrees is generated. An amplitude of the error is approximately 0.7 degrees in a machine angle. On the other hand, if the number of turns is set to that in accordance with this embodiment (solid line of the figure), it is seen that the error can be reduced and its amplitude becomes approximately 0.4 degrees, and the rotation angle detection device functions as the one with higher accuracy than that of the conventional example. In addition, in this embodiment, since the number of turns is the same in the output windings of opposing teeth, there is an effect that the device is unlikely to be affected by eccentricity of the rotor.

Although the example of the rotation angle detection device with a shaft multiple angle of 2 is described in this embodiment, since the number of the teeth is four if a shaft multiple angle is 1, it is sufficient to set the number of turns to, for example, N±m, 0, N and 0 in the order of the teeth numbers 1, 2, 3 and 4 in the output winding (1) and 0, N, 0 and N in the order of the teeth numbers 1, 2, 3 and 4 in the output winding (2). In addition, the same is true for a rotation angle detection device with a shaft multiple angle of 3 or more. For example, it is sufficient to, for example, repeat the pattern the number of turns of N±m, 0, N and 0 by the shaft multiple angle in the output winding (1) and repeat the pattern of number of turns of 0, N, 0 and N by the shaft multiple angle in the output winding (2).

As described above, in a rotation angle detection device consisting of a stator, which is provided with an excitation winding of one phase and two-phase output windings, and a rotor having salient poles, the rotation angle detection device has a structure in which the two-phase output windings are wound around a plurality of teeth of the stator, and a certain one-phase output winding is wound around such that the number of turns in each tooth is N±m, 0, N and 0 (it is assumed that N and m are positive integers and N>m) or this pattern of the number of turns is repeated and another one-phase output winding is wound around such that the number of turns in each tooth is 0, N, 0 and N or this pattern of the number of turns is repeated. Thus, there is an effect that a detecting position error caused by a machining error can be reduced and, since a phase of a detecting position error to be generated intentionally in order to correct this detecting position error can be controlled at an interval of an electrical angle of 90 degrees and its amplitude can also be controlled, a detecting position error can be reduced efficiently and a highly accurate rotation angle detection device can be realized.

Third Embodiment

In this embodiment, it will be described that a detecting position error can be reduced more effectively than the second embodiment by constituting a rotation angle detection device to have a structure in which output windings are wound around a plurality of teeth of a stator, a certain one-phase output winding is wound such that the number of turns in each tooth becomes N, 0, N±m$_1$ and 0 (it is assumed that N and m$_1$ is positive integers and N>m$_1$) or this pattern of the number of turn is repeated, and another one-phase output winding is wound around such that the number of turns in each tooth becomes 0, N±m$_2$, 0 and N (it is assumed that N and m$_2$ is positive integers and N>m$_2$) or this pattern of the number of turns is repeated.

In the second embodiment, it is described that, with the aim of correcting a detecting position error caused by a machining error, a phase of a detecting position error to be generated intentionally can be changed by the unit of an electrical angle of 90 degrees and it is even possible to control its amplitude. However, if $\alpha_1$ and $\alpha_2$ can be adjusted to arbitrary values from Expressions (12) and (13), a phase and an amplitude of a detecting position error to be generated intentionally can be controlled arbitrarily, and a detecting position error can be reduced more effectively.

Figure 9:
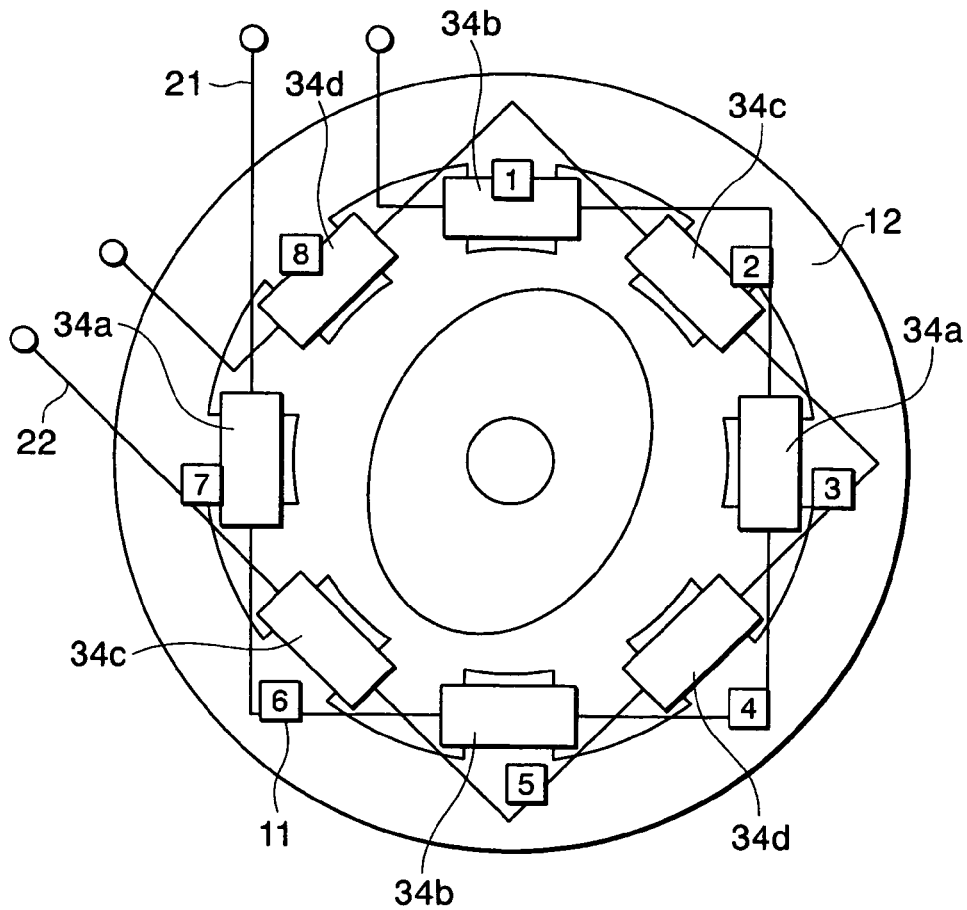
FIG. 9 is a diagram showing a winding specification of a rotation angle detection device in a third embodiment of the present invention.

FIG. 9 is a diagram showing a structure of the rotation angle detection device in this embodiment. In FIG. 9, reference numeral 12 denotes a stator having eight teeth 11. Numerals 1 to 8 in the figure indicate teeth numbers of the teeth 11. Reference numerals 34a, 34b, 34c and 34d are output windings wound around the teeth 11. The output windings 34a and 34b belong to an output winding (1) (denoted by reference numeral 21 in the figure) and the output windings 34c and 34d belong to an output winding (2) (denoted by reference numeral 22 in the figure). In the output winding (1), the number of turns of the output winding 34a (output winding wound around the teeth with the teeth numbers 3 and 7) is N±m$_1$ and the number of turns of the output winding 34b (output winding wound around the teeth with the teeth numbers 1 and 5) is N. In addition, in the output winding (2), the number of turns of the output winding 34c (output windings wound around the teeth with the teeth numbers 2 and 6) is N±m$_2$ and the number of turns of the output winding 34d (output winding wound around the teeth with the teeth numbers 4 and 8) is N. FIG. 10 shows the number of turns of the output winding in each tooth of FIG. 9.

This embodiment will be described with reference to FIGS. 9 and 10. Again, a rotation angle detection device with a shaft multiple angle of 2 will be described as in the first and second embodiments. In FIG. 9, an excitation winding is not shown but is actually wound around each tooth concentrically to have opposite polarities in adjacent teeth as in the first and second embodiments. Here, the number of turns of the output winding (1) 21 is N, 0, N±m$_1$, 0, N, 0, N±m$_1$ and 0 in the order of teeth numbers 1, 2, 3, 4, 5, 6, 7 and 8. The number of turns of the output winding (2) 22 is 0, N±m$_2$, 0, N, 0, N±m$_2$, 0 and N in the order of teeth numbers 1, 2, 3, 4, 5, 6, 7 and 8. It is assumed here that N, m$_1$ and m$_2$ are positive integers and N>m$_1$ and N>m$_2$. In addition, as described in the first embodiment, polarities of the windings alternate. The output winding (1) 21 is wound around to have the same polarity in the teeth with the teeth numbers 1 and 5 and in the teeth with the teeth numbers 3 and 7 and have opposite polarities in the teeth with the teeth numbers 1 and 3. The output winding (2) 22 is wound around to have the same polarity in the teeth with the teeth numbers 2 and 6 and in the teeth with the teeth numbers 4 and 8 and have opposite polarities in the teeth with the teeth numbers 2 and 4. It will be considered how the output windings constituted in this way picks up a magnetic flux of a spatial fourth order component. A magnetic flux of a spatial fourth order component linking for the number of turns of one of the winding in each tooth is set to be $\Phi$. Then, the magnetic flux of a spatial fourth order component linking with the output winding (1) can be represented as follows if polarities and the number of turns in the teeth with the teeth numbers 1, 3, 5 and 7 are taken into account:

$$\Phi(N\pm m_1-N+N\pm m_1-N)=\pm m_1\Phi \quad (14)$$

As to the output winding (2), the magnetic flux of a spatial fourth order component is represented as follows if the number of turns and polarities are similarly taken into account and attention is paid to the fact that phases of the magnetic flux of a spatial fourth order component are reversed from those of the positions of the teeth around which the output winding (1) is wound:

$$-\Phi(N\pm m_2-N+N\pm m_2-N)=\mp m_2\Phi \quad (15)$$

However, although the double sign applies in the same order as written in each of Expressions (14) and (15), it does not always apply in the same order as written in both Expressions (14) and (15). Since these magnetic fluxes and a direct current component included in an amplitude change of a voltage of the output windings are in a proportional relationship, that is, the right sides of Expressions (10) and (11) and $\alpha_1$ and $\alpha_2$ are in a proportional relationship, respectively, Expression (13) can be rewritten as follows:

$$\cos\beta = \frac{\pm m_1}{\sqrt{m_1^2+m_2^2}}, \sin\beta = \frac{\mp m_2}{\sqrt{m_1^2+m_2^2}} \quad (16)$$

However, the double sign applies in the same order as written. It is seen from this expression that a phase of a detecting position error to be generated intentionally for correcting a detecting position error caused by a machining error can be set arbitrarily by changing m$_1$ and m$_2$. Moreover, an amplitude of the detecting position error is calculated as follows from Expression (12):

$$\sqrt{\alpha_1^2+\alpha_2^2} \propto \sqrt{m_1^2+m_2^2} \quad (17)$$

Thus, it is seen that an amplitude of the detecting position error to be generated intentionally can also be set arbitrarily. Although the example in which the number of turns in the teeth with the teeth numbers 1 and 5 is set to be N±m$_1$ and the number of turns in the teeth with the teeth numbers 3 and 7 is set to be N is shown in FIG. 9, the number of turns in the teeth with the teeth numbers 1 and 5 may be N and the number of turns in the teeth with the teeth numbers 3 and 7 may be N±m$_1$. This is because the magnetic flux of a spatial fourth order component linking with the output winding (1) 21 is the same in that both of a phase and an amplitude of a detecting position error to be generated intentionally can be adjusted with only a sign on the right side of Expression (14) reversed. Similarly, the same is true for the output winding (2) 22, and the number of turns in the teeth with the teeth numbers 2 and 6 may be N and the number of turns in the teeth with the teeth numbers 4 and 8 may be N±m$_2$. Since a phase and an amplitude of a detecting position error to be generated intentionally with the aim of correcting a detecting position error caused by a machining error can be set arbitrarily, it is seen that correction of an error can be made more effectively and a highly accurate rotation angle detection device can be realized.

Figure 11:
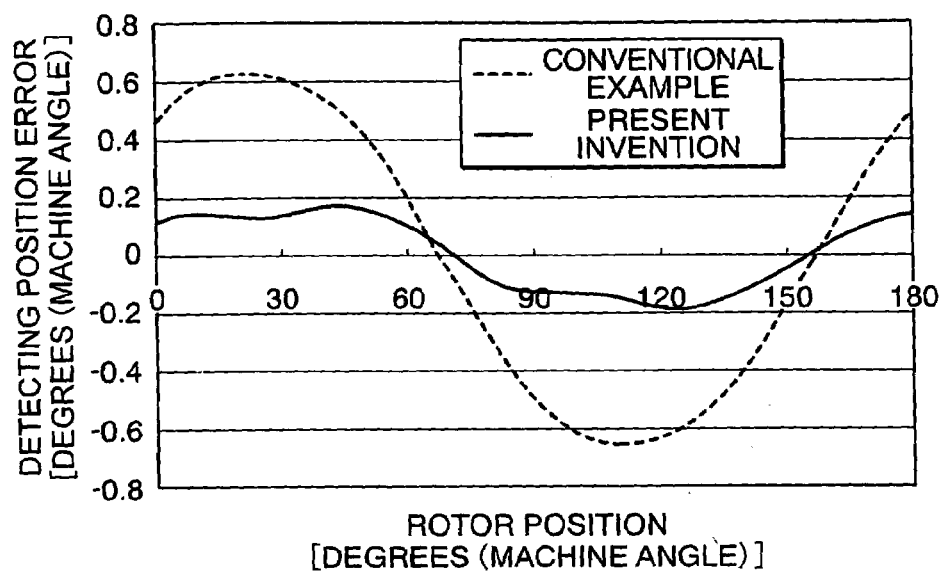
FIG. 11 explains comparison of detecting position errors of a conventional example and the third embodiment of the present invention by a graph.

As a specific example of this embodiment, as shown in FIG. 10, it is possible to reduce the detecting position error caused by the machining error in the case in which N=158, $m_1=1$, $m_2=1$, and + is selected as a sign in each case. FIG. 11 shows a detecting position error in the case in which roundness of an internal diameter of the stator deteriorates. The horizontal axis indicates a position of a rotor in terms of a machine angle and the vertical axis indicates a detecting position error in terms of a machine angle. As in the conventional example, if the number of turns of the output windings is set as in the conventional example (broken line in the figure), a detecting position error having a period of a machine angle of 180 degrees, that is, an electrical angle of 360 degrees is generated. An amplitude of the error is approximately 0.6 degrees in a machine angle. On the other hand, if the number of turns is set to that in accordance with this embodiment (solid line of the figure), it is seen that the error can be considerably reduced and its amplitude becomes approximately 0.2 degrees, and the rotation angle detection device functions as the one with higher accuracy than that of the conventional example. In addition, in this embodiment, since the number of turns is the same in the output windings of opposing teeth, there is an effect that the apparatus is unlikely to be affected by eccentricity of the rotor.

Although the example of the rotation angle detection device with a shaft multiple angle of 2 is described in this embodiment, since the number of the teeth is four if a shaft multiple angle is 1, it is sufficient to set the number of turns to, for example, $N\pm m_1$, 0, N and 0 in the order of the teeth numbers 1, 2, 3 and 4 in the output winding (1) and 0, $N\pm m_2$, 0 and N in the order of the teeth numbers 1, 2, 3 and 4 in the output winding (2). In addition, the same is true for a rotation angle detection device with a shaft multiple angle of 3 or more. For example, it is sufficient to, for example, repeat the pattern of $N\pm m_1$, 0, N and 0 by the shaft multiple angle in the output winding (1) and repeat the pattern of 0, $N\pm m_2$, 0 and N by the shaft multiple angle in the output winding (2).

As described above, in a rotation angle detection device consisting of a stator, which is provided with an excitation winding of one phase and two-phase output windings, and a rotor having salient poles, the rotation angle detection device has a structure in which the two-phase output windings are wound around a plurality of teeth of the stator, and a certain one-phase output winding is wound around such that the number of turns in each tooth is $N+m_1$, 0, N and 0 (it is assumed that N and $m_1$ are positive integers and $N>m_1$) or this pattern of the number of turns is repeated and another one-phase output winding is wound around such that the number of turns in each tooth is 0, $N\pm m_2$, 0 and N (it is assumed that N and $m_2$ are positive integers and $N>m_2$) or this pattern of the number of turns is repeated. Thus, there is an effect that a detecting position error caused by a machining error can be reduced and, since a phase of a detecting position error to be generated intentionally in order to correct this detecting position error can be arbitrarily controlled and its amplitude can also be arbitrarily controlled, a detecting position error can be reduced efficiently and a highly accurate rotation angle detection device can be realized.

Fourth Embodiment

Figure 12:
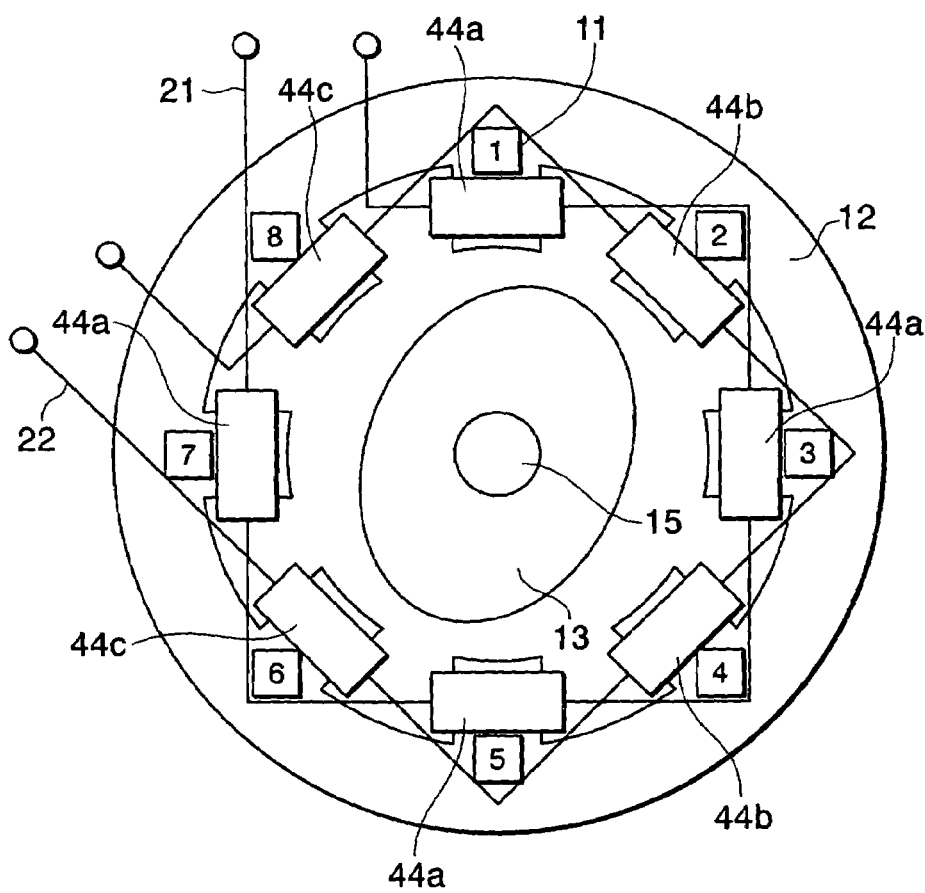
FIG. 12 is a diagram showing a winding specification of a rotation angle detection device in a fourth embodiment of the present invention.

FIG. 12 is a diagram showing a structure of a rotation angle detection device in this embodiment. In FIG. 12, reference numeral 11 denotes teeth and 12 denotes a stator having eight teeth 11. Numerals 1 to 8 in the figure indicate teeth numbers of the teeth 11. Reference numeral 13 denotes a rotor, reference symbol 44a denotes output winding (1) wound around the teeth 11, and 44b and 44c denote output windings (2) wound around the teeth 11. The number of turns is N for the output winding 44a (output winding wound around the teeth with the teeth numbers 1, 3, 5, and 7), N+m for the output winding 44b (output winding wound around the teeth with the teeth numbers 2 and 4), and N for the output winding 44c (output winding wound around the teeth with the teeth numbers 6 and 8). In addition, reference numeral 15 denotes a rotation shaft of the rotor 13. FIG. 13 collectively shows the numbers of turns of the output windings in the respective teeth as described above.

Figure 26:
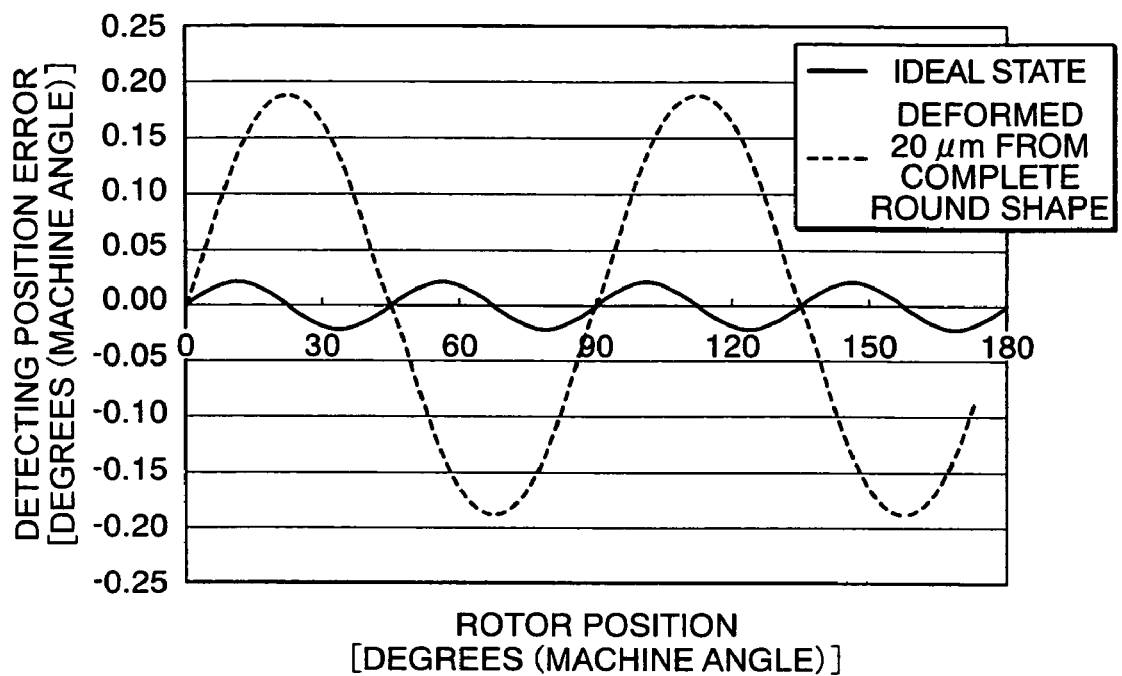
FIG. 26 explains changes in a detecting position error in the case in which an internal diameter of a winding of a stator deforms into a square shape and deviates from a complete round shape by 20 μm.

As described using the conventional example of FIG. 24 and as shown in the above-mentioned graph of FIG. 26 when the internal diameter of the stator deviated from a complete round shape by 20□m and deforms into a square shape, a period of a detecting position error is a machine angle of 90 degrees, which is 180 degrees in terms of an electrical angle. However, an electrical angle is set to take a value obtained by multiplying a machine angle by a shaft multiple angle. In addition, a phase of this error with the period of the electrical angle of 180 degrees changes into various values depending on a machining error that has occurred.

Judging from the above in this embodiment, a detecting position error caused by a machining error of a shape of a stator would be able to be reduced and a highly accurate rotation angle detection device can be realized if a specification of output windings is devised from the conventional example shown in FIG. 24 and changed such that an error with the period of the electrical angle of 180 degrees can be corrected. In addition, as descibed above in the first embodiment, if such an error occurs due to accuracy of a mold for punching out a core of a stator, a detecting position error of a similar tendency would occur as long as the same mold is used, and a possibility that a winding specification for correcting an error has to be changed in respective rotation angle detection devices even at the time of mass production would be low.

Thus, a method of intentionally generating an error with the period of the electrical angle of 180 degrees by devising output windings will be considered. As a first step of the consideration, a cause of an error with the period of the electrical angle of 180 degrees will be examined. In the rotation angle detection device with the above-mentioned structure, as a position of a rotor is changed while applying an alternating current to an excitation winding, a voltage generated in the two-phase output windings changes in a sine wave shape, and its changing phases deviate by an electrical angle of 90 degrees in the two-phase output windings, from each other. Therefore, when an amplitude of the voltage generated in the two-phase output windings is plotted in each rotor position, a graph as shown in FIG. 27 can be obtained. However, a negative amplitude of a voltage of an output winding means that a phase is reversed from the time when an amplitude is positive. In this way, if the voltage generated in the output winding ideally changes in a sine wave shape with respect to a rotation angle, when its amplitude is set to be e1 and e2 in the two-phase output windings, i.e, the output windings (1) and (2), respectively, and a rotation angle (machine angle) of the rotor is set to be $\psi$ [rad], since the rotation angle detection device with the above-mentioned structure has a shaft multiple angle of 2, e1 and e2 can be represented as follows:

$$e_1(\phi) = \sin 2\phi \qquad (18)$$

$$e_2(\phi) = \cos 2\phi \qquad (19)$$

However, an amplitude of a voltage is standardized with a maximum value as one. The waveform of FIG. 27 is ideally a sine wave with the same amplitude but actually, in some case, the amplitude differs in the two-phase output windings due to a machining error or the like. When amplitudes of output voltages differ in such a manner that the amplitude of the output voltage of the output winding (2) becomes (1+a) times that of the output winding (1), provided that amplitudes of the voltages of the two-phase output windings are set to be e1' and e2', e1' and e2' can be represented as follows:

$$e_1'(\phi) = \sin 2\phi \quad (20)$$

$$e_2'(\phi) = (1+\alpha)\cos 2\phi \quad (21)$$

Here, assuming that $$2\varphi = \tan^{-1}\frac{e_1(\varphi)}{e_2(\varphi)} \quad (22)$$

$$2\varphi' = \tan^{-1}\frac{e_1'(\varphi)}{e_2'(\varphi)} \quad (23)$$

a detecting position error ϵ [rad] (electrical angle) is found as follows from Expressions (18) to (23):

$$\begin{aligned}\tan\varepsilon &= \tan(2\varphi - 2\varphi') \\ &= \frac{\tan 2\varphi - \tan 2\varphi'}{1 + \tan 2\varphi \tan 2\varphi'} \\ &= \frac{\alpha \sin 2\varphi \cos 2\varphi}{\cos^2 2\varphi + (1+\alpha)\sin^2 2\varphi} \\ &= \frac{\frac{\alpha}{2}\sin 4\varphi}{1 + \alpha \sin^2 2\varphi}\end{aligned} \quad (24)$$

If α<<1, Expression (24) can be approximated as in the following expression:

$$\tan\varepsilon \approx \frac{\alpha}{2}\sin 4\varphi \quad (25)$$

In addition, if ϵ is sufficiently small, the following expression is established:

$$\tan \varepsilon \approx \varepsilon$$

Thus, the detecting position error ϵ is obtained as follows:

$$\varepsilon \approx \frac{\alpha}{2}\sin 4\varphi \quad (26)$$

From the above-mentioned consideration, effects of a difference of voltages of two-phase output windings on a detecting position error are clarified.

For example, in the conventional rotation angle detection device of FIG. 24, if the internal diameter of the stator 102 deforms to be a square shape, the teeth 101 around which the one-phase output winding is wound approaches the rotor 103 side, and the teeth 101 around which the output winding of the other phase separates from the rotor 103. Thus, a difference occurs in magnetic fluxes linking with the two-phase output windings. Therefore, an error of a period of an electrical angle of 180 degrees occurs judging from the above-mentioned consideration. However, if the windings are devised such that a difference occurs in voltages of the two-phase output windings in an ideal state without a machining error, a detecting position error caused by deformation of an internal diameter can be corrected and reduced.

An output winding for reducing an error of a period of an electrical angle of 180 degrees, that is, an output winding in which a difference occurs in voltages of output windings of two phases in an ideal state without a machining error, will be hereinafter considered. In the conventional rotation angle detection device with a shaft multiple angle of 2 of FIG. 24, an excitation winding (not shown) is wound around each tooth 101 concentrically to have opposite polarities in adjacent teeth 101. Thus, a magnetomotive force generated by an electric current flowing to the excitation winding becomes a component of eight poles, that is, a spatial fourth order component.

On the other hand, the rotor 103 includes two salient poles and has a spatial second order component as a component of permeance pulsation. Therefore, it can be considered that a spatial order of a magnetic flux generated in a gap has components of a sum and a difference of the order of the magnetomotive force and the order of the permeance, that is, 4+2=6 and 4−2=2 as main components and, moreover, also includes a large quantity of components that are the same as the magnetomotive force generated by the electric current of the excitation winding, that is the spatial fourth component. The components of the sum and the difference of the order of the magnetomotive force and the order of the permeance, that is, the spatial second order component and the spatial sixth order component in this context changes according to a position of the rotor 103. The output winding operates as the rotation angle detection device by picking up the change in the magnetic flux. On the other hand, the same component as the magnetomotive force generated by the electric current of the excitation winding, that is, the spatial fourth order component hardly changes according to a position of the rotor and remains substantially constant.

Figure 28:
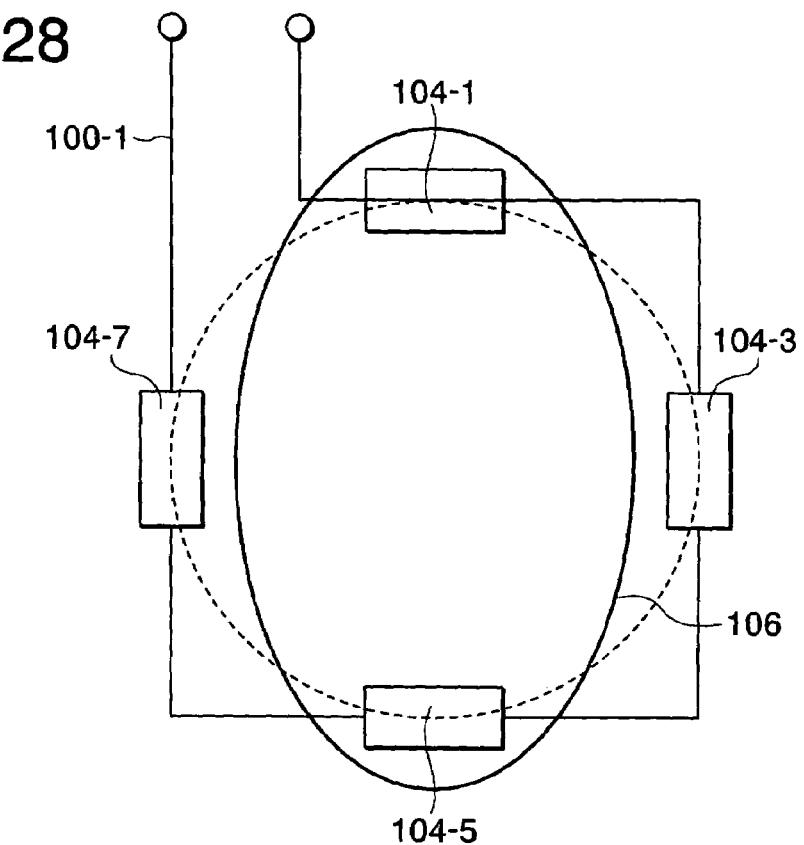
FIG. 28 explains how a magnetic flux of the spatial second order links with output windings.
Figure 29:
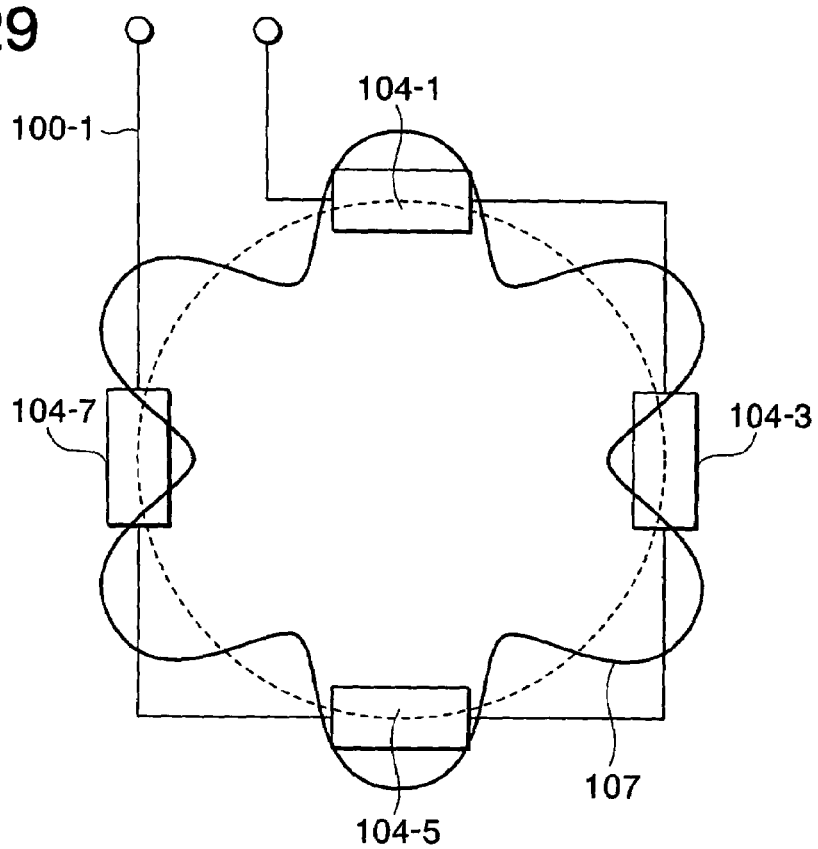
FIG. 29 explains how a magnetic flux of the spatial sixth order links with output windings.

In order to realize output windings in which a difference is generated in voltages of two-phase output windings in an ideal state without a machining error, the output windings must be arranged such that both the two-phase output windings do not pick up a magnetic flux of the spatial fourth order, and a difference must be generated between the two-phase output windings for magnetic fluxes of the spatial second order and the spatial fourth order. Thus, a flux linkage of the output windings will be considered for a spatial second order component, a spatial sixth order component and a spatial fourth order component. FIG. 28 is a view for explaining how a magnetic flux of the spatial second order links with the output windings. Only the output winding (1) (reference numeral 100-1) is shown as a winding. The magnetic flux of the spatial second order is indicated by a solid line of an elliptic shape. FIG. 29 is a view for the spatial sixth order, and FIG. 30 is a view for the spatial fourth order. Here, the numbers of turns in the teeth with the teeth numbers 1 to 8 are set to be $N_1$ to $N_8$, respectively. When the spatial second order component, the spatial sixth order component and the spatial fourth order component of a gap magnetic flux density are set to be $\phi_2$, $\phi_6$ and $\phi_4$, respectively, if magnetic fluxes of the spatial second order, the spatial sixth order and the spatial fourth order linking with the output winding (1) are set to be $\phi_{21}$, $\phi_{61}$ and $\phi_{41}$, it is understood that the following expressions are established with reference to FIGS. 28, 29 and 30 and paying attention to polarities of the winding:

$$\Phi_{21} = (N_1 + N_3 + N_5 + N_7)\phi_2 \quad (27)$$

$$\Phi_{61} = (N_1 + N_3 + N_5 + N_7)\phi_6 \quad (28)$$

$$\Phi_{41} = (N_1 - N_3 + N_5 - N_7)\phi_4 \quad (29)$$

The same is true for the output winding (2). If magnetic fluxes of the spatial second order, the spatial sixth order and the spatial fourth order linking with the output winding (1) are set to be $\phi_{22}$, $\phi_{62}$ and $\phi_{42}$, the following expressions are established:

$$\Phi_{22} = (N_2 + N_4 + N_6 + N_8)\phi_2 \quad (30)$$

$$\Phi_{62} = (N_2 + N_4 + N_6 + N_8)\phi_6 \quad (31)$$

$$\Phi_{42} = (N_2 - N_4 + N_6 - N_8)\phi_4 \quad (32)$$

Since all of the numbers of turns $N_1$ to $N_8$ are equal to N in the winding specification of the conventional example as shown in FIG. 13, the following expressions are established from Expressions (27) to (32):

$$\Phi_{21} = \Phi_{22} = 4N\phi_2, \; \Phi_{61} = \Phi_{62} = 4N\phi_6, \; \Phi_{41} = \Phi_{42} = 0 \quad (33)$$

Figure 14:
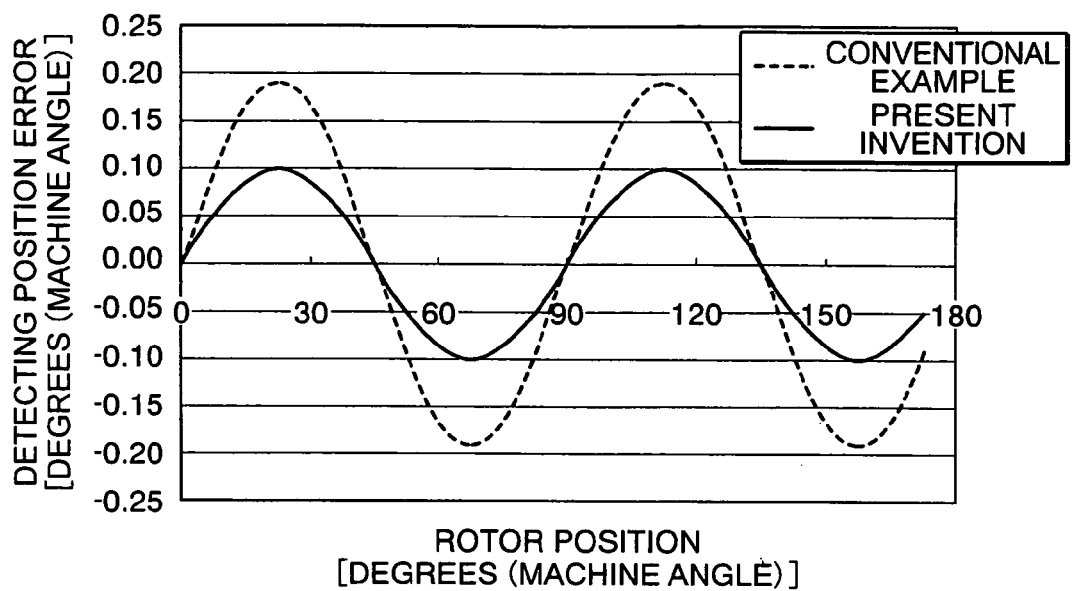
FIG. 14 explains comparison of detecting position errors of a conventional example and the fourth embodiment of the present invention by a graph.

Magnetic fluxes for the spatial second order and the spatial fourth order are picked up in the conventional winding specification, and their amplitudes are equal in the two-phase output windings and, moreover, the magnetic flux of the spatial fourth order is not picked up. However, in the present invention, if the numbers of turns in the teeth with the teeth numbers 2 and 4 of the output winding (2) are changed to N+m (m is a positive integer and N>m) as shown in FIG. 14, the following expressions are established from Expressions (27) to (32):

$$\Phi_{21} = 4N\phi_2, \; \Phi_{61} = 4N\phi_6, \; \Phi_{41} = 0 \quad (34)$$

$$\Phi_{22} = (4N+2m)\phi_2, \; \Phi_{62} = (4N+2m)\phi_6, \; \Phi_{42} = 0 \quad (35)$$

A difference is generated for magnetic flux components of the spatial second order and the spatial sixth order required for knowing a position of a rotor, and a magnetic flux is not picked up for the spatial fourth order as in the conventional example. Consequently, a difference can be generated in output voltages in the output windings (1) and (2), and an error of a period of an electrical angle of 180 degrees can be generated intentionally.

A ratio of linkage fluxes of output windings, that is a ratio of output voltages can be found from Expressions (34) and (35). It is evident from Expressions (34) and (35) that a voltage of the output winding (2) is as large as a voltage of the output winding (1) multiplied by the following expression if it is standardized by the voltage of the output winding (1):

$$\frac{4N + 2m}{4N} = 1 + \frac{m}{2N} \quad (36)$$

This corresponds to the case in which $\alpha = m/2N$ in Expression (21), and an error $\epsilon$ to be generated intentionally is found as follows:

$$\varepsilon \approx \frac{m}{4N}\sin 4\varphi \quad (37)$$

Therefore, it can be understood that an error of a period of an electrical angle of 180 degrees caused by a machining error can be corrected and reduced by selecting N and m appropriately.

The case in which N=158 and m=2 in FIG. 13 will be described as a specific example of the present invention. FIG. 14 shows waveforms of detecting position errors. If the conventional winding specification (N=158 in FIG. 25) is used, a detecting position error is small as indicated by the solid line of FIG. 26. However, a detecting position error of a period of a machine angle of 90 degrees, that is, a period of an electrical angle of 180 degrees increases by a machining error. Thus, it can be said that the winding specification of the present invention (N=158 and m=2 in FIG. 13) reduces a detecting position error of a period of an electrical angle of 180 degrees as indicated by the solid line and the rotation angle detection device operates as a highly accurate rotation angle detection device.

Although the case in which the numbers of turns in the teeth with the teeth numbers 2 and 4 of the output winding (2) are changed to N+m is described here, it is seen from Expression (37) that an error can be similarly reduced if the numbers of turns are changed to N−m when a phase of a detection position error by a machining error is reversed. In addition, it is needless to mention that the same effect is realized if the numbers of turns in the teeth with the teeth numbers 6 and 8 or the teeth numbers 4 and 6 are changed rather than the numbers of turns in the teeth with the teeth numbers 2 and 4. In addition, although the case in which the number of turns of the output winding (2) is described, it is needless to mention that the same effect can be realized if the number of turns of the output winding (2) remains the same as the conventional example and the number of turns of the output winding (1) is changed. Further, although the case in which one output winding has at least one pattern of N+m, 0, N+m and 0 is shown in FIG. 13, it is needless to mention that the same effect is realized in the case in which one output winding has at least one pattern of N−m, 0, N−m and 0. Moreover, although a rotation angle detection device with a shaft multiple angle of 2 is described here, since the number of teeth is four in the case of a shaft multiple angle of 1, the same effect is realized if, for example, the number of turns of the output winding (1) is changed to N±m, 0, N±m and 0 (the double sign applies in the same order as written) in the order of the teeth 1 to 4 and the number of turns of the output winding (2) is changed to 0, N, 0 and N. In addition, as to a rotation angle detection device with a shaft multiple angle of 3 or more, it is needless to mention that the same effect of reduction of a detecting position error is realized by keeping the number of turns of one output winding the same as the conventional example and providing at least one pattern of the number of turns N±m, 0, N±m and 0 (the double sign is applied in the same order as written) in the other output winding.

As described above, in a rotation angle detection device consisting of a stator, which is provided with an excitation winding of one phase and two-phase output windings, and a rotor having salient poles, the rotation angle detection device has the structure in which the two-phase output windings are wound around a plurality of teeth of the stator, at least one pattern of the number of turns N±m, 0, N±m and 0 (the double sing applies in the same order as written) is provided in one output winding (N and m are positive integers and N>m), and the other output winding is provided with a pattern of the number of turns 0, N, 0 and N or is constituted by repetition of this pattern. Thus, since a detecting position error caused by a machining error such as deterioration of roundness of an internal diameter of a stator, or the like can be corrected, there is an effect that a rotation angle detection device with a small detecting position error, that is, high accuracy can be realized.

Fifth Embodiment

In the fourth embodiment, the case in which a part of the numbers of turns of output windings is changed as shown in FIG. 13 and the output windings have at least one pattern of teh number of turns N±m, 0, N±m and 0 (the double sign applies in the same order as written) is described. In this embodiment, a case in which a one-phase output winding among two phases is constituted by repetition of the pattern of number of turns N±m, 0, N±m and 0 (the double sign applies in the same order as written) will be considered.

Figure 15:
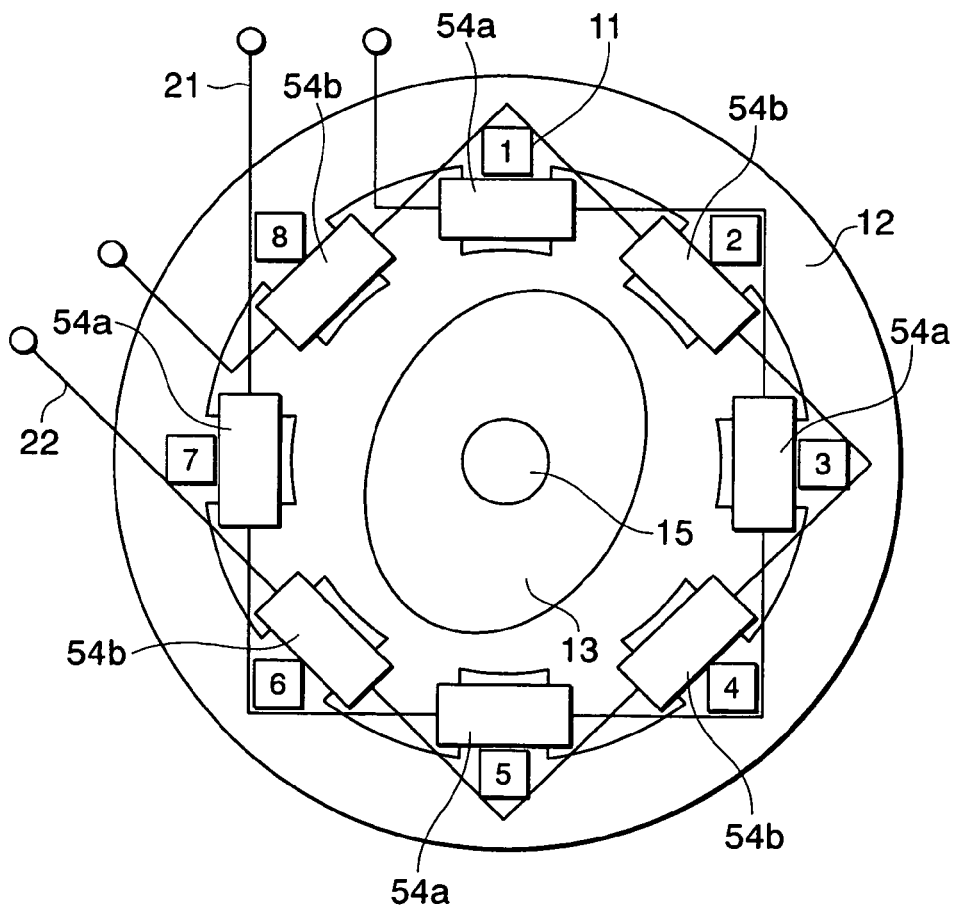
FIG. 15 is a diagram showing a winding specification of a rotation angle detection device in a fifth embodiment of the present invention.

FIG. 15 is a diagram showing a structure of a rotation angle detection device in this embodiment. In FIG. 15, reference numeral 11 denotes teeth and 12 denotes a stator having eight teeth 11. Numerals 1 to 8 in the figure indicate teeth numbers of the teeth 11. Reference numeral 13 denotes a rotor and 54a and 54b respectively denote output windings (1) and (2) wound around the teeth 11. The number of turns is N for the output winding 54a (output winding wound around the teeth with the teeth numbers 1, 3, 5 and 7) and N−m for the output winding 54b (output winding wound around the teeth with the teeth numbers 2, 4, 6, and 8). In addition, reference numeral 15 denotes a rotation shaft of the rotor 13. FIG. 16 collectively shows the number of turns of the output windings in the respective teeth as described above.

The output winding (1) is set to have the number of turns N that is the same as the conventional example, and all the numbers of turns are set to be N±m for the output winding (2). In this case, $\Phi_{21}, \Phi_{61}, \Phi_{41}, \Phi_{22}, \Phi_{62}$ and $\Phi_{42}$ are found as follows:

$$\Phi_{21}=4N\phi_2, \ \Phi_{61}=4N\phi_6, \ \Phi_{41}=0 \tag{38}$$

$$\Phi_{22}=(4N\pm4m)\phi_2, \ \Phi_{62}=(4N\pm4m)\phi_6, \ \Phi_{42}=0 \tag{39}$$

Then, a ratio of output voltages of the output windings (1) and (2) is found as follows:

$$\frac{4N\pm4m}{4N}=1\pm\frac{m}{N} \tag{40}$$

This corresponds to the case in which $\alpha=\pm m/N$ in Expression (21). Thus, an error $\epsilon$ [rad] (electrical angle) to be generated intentionally is found as follows:

$$\varepsilon \approx \pm\frac{m}{2N}\sin 4\varphi \tag{41}$$

In addition, if the output winding (2) is set to have the number of turns N that is the same as the conventional example, and all the numbers of turns are set to be N±m for the output winding (1), $\Phi_{21}, \Phi_{61}, \Phi_{41}, \Phi_{22}, \Phi_{62}$ and $\Phi_{42}$ are similarly found as follows:

$$\Phi_{21}=(4N\pm4m)\phi_2, \ \Phi_{61}=(4N\pm4m)\phi_6, \ \Phi_{41}=0 \tag{42}$$

$$\Phi_{22}=4N\phi_2, \ \Phi_{62}=4N\phi_6, \ \Phi_{42}=0 \tag{43}$$

Thus, a ratio of output voltages of the output windings (1) and (2) is found as follows:

$$\frac{4N}{4N\pm4m}=\left(1\pm\frac{m}{N}\right)^{-1}\approx 1\mp\frac{m}{N} \tag{44}$$

This corresponds to the case in which $\alpha=\pm m/N$ in Expression (21) (provided that m<<N). Thus, an error $\epsilon$ [rad] (electrical angle) to be generated intentionally is found as follows:

$$\varepsilon \approx \mp\frac{m}{2N}\sin 4\varphi \tag{45}$$

Figure 18:
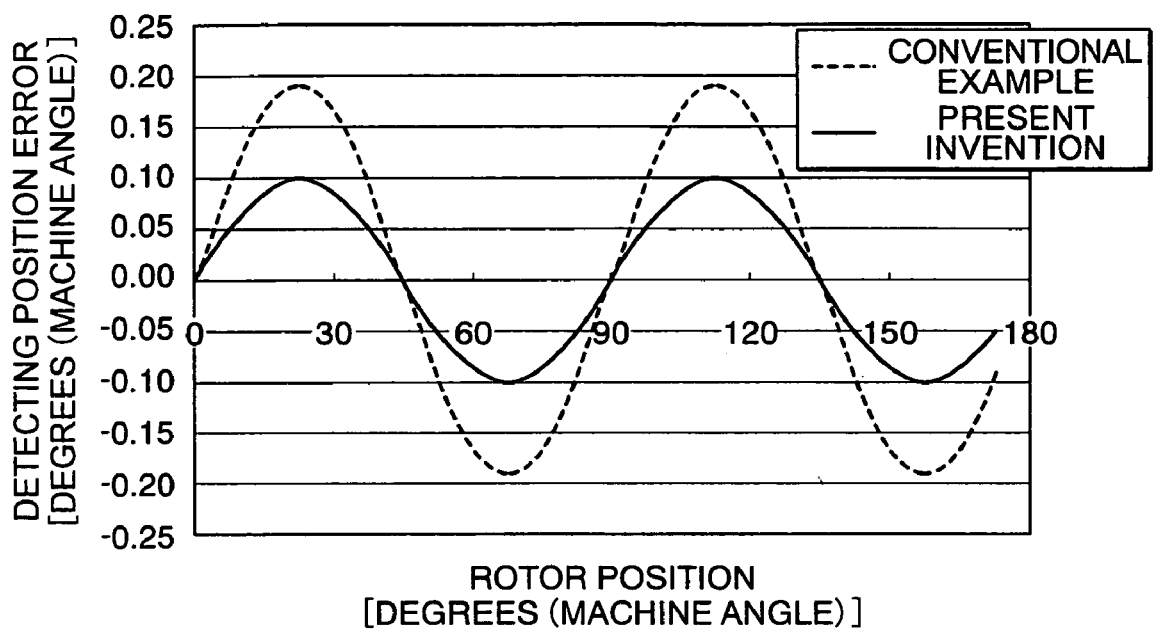
FIG. 18 explains comparison of detecting position errors of a conventional example and the fifth embodiment of the present invention by a graph.

Thus, a detecting position error for the case in which N=158 and m=1 in the winding specification of FIG. 16 is found by a magnetic field analysis as a specific example. FIG. 18 shows results of the analysis. It is seen that, in the conventional winding, an error of a period of an electrical angle of 180 degrees with an amplitude of a machine angle of approximately 0.19 (0.38 in an electrical angle) is observed, whereas this error is reduced in the winding specification of FIG. 16 and the rotation angle detection device operates as a highly accurate rotation angle detection device.

Further, FIG. 16 shows the case in which the number of turns of the output winding (1) 21 is equivalent to the conventional example and the number of turns of the output winding (2) 22 is changed from the conventional example, that is, the winding specification of FIG. 15 in a table format. FIG. 17 shows the contrary case, that is, the case in which the number of turns of the output winding (1) 21 is changed from the conventional example and the number of turns of the output winding (2) 22 is equivalent to the conventional example. Note that the changed number of turns is described as N−m in each tooth in FIG. 16, whereas the changed number of turns is described as N+m in each tooth in FIG. 17. However, this is not limited to the examples shown in the figures. In this embodiment, it is sufficient if the number of turns is N±m, 0, N±m and 0 in one output winding or is constituted by repetition of the pattern of the number of turns of N±m, 0, N±m and 0 (N and m are positive integers and N>m) and the number of turns is 0, N, 0 and N in the other output winding or is constituted by repetition of this pattern.

Figure 19:
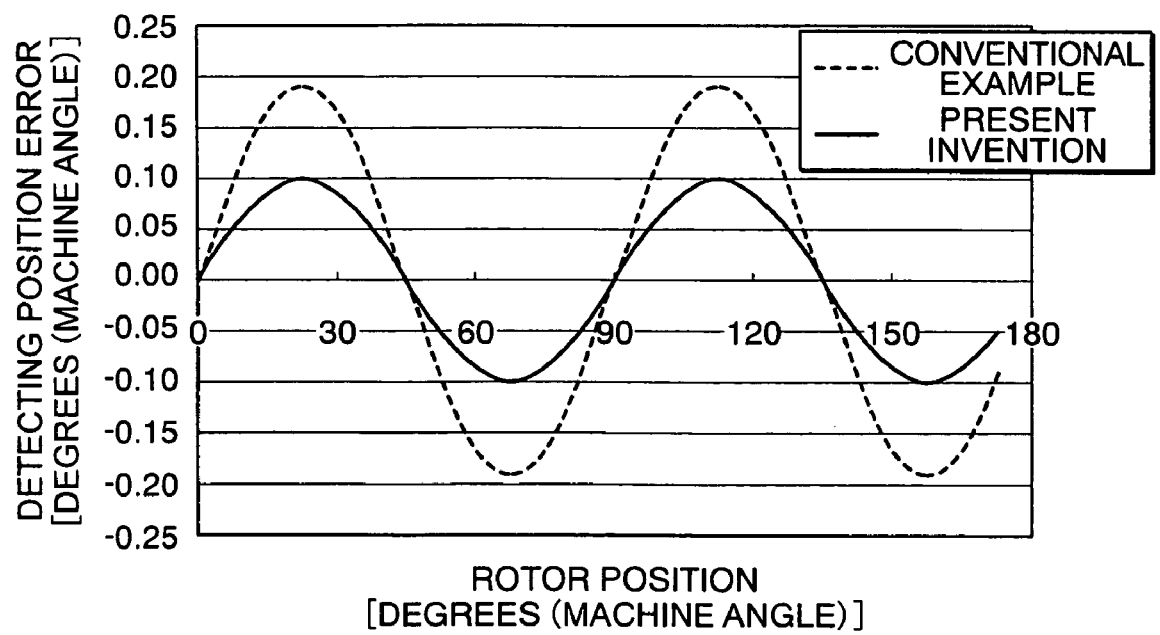
FIG. 19 explains comparison of detecting position errors of a conventional example and the modification of the fifth embodiment of the present invention by a graph.

The case in which N=158 and m=1 in the winding specification of FIG. 17 is shown in FIG. 19. It is seen that, although an error of a period of an electrical angle of 180 degrees with an amplitude of a machine angle of approximately 0.19 (0.38 in an electrical angle) is also observed in the conventional winding in this case, this error is reduced in the winding specification of FIG. 17 and the rotation angle detection device operates as a highly accurate rotation angle detection device.

Although the rotation angle detection device with a shaft multiple angle of 2 is described here, the same is true for a rotation angle detection device with a shaft multiple angle of 3 or more. For example, in the case of a rotation angle detection device with a shaft multiple angle of 3, the same effect is realized, for example, if a specification is used in which the pattern of the number of turns of N±m, 0, N±m and 0 is repeated three times for the output winding (1) and the pattern of the number of turns of 0, N, 0 and N is repeated three times for the output winding (2) in twelve teeth. Moreover, it is also evident that Expressions (41) and (45) do not change according to a shaft multiple angle, and the effect of reduction of a detecting position error is realized regardless of a shaft multiple angle.

As described above, in a rotation angle detection device consisting of a stator, which is provided with an excitation winding of one phase and two-phase output windings, and a rotor having salient poles, the rotation angle detection device has the structure in which the two-phase output windings are wound around a plurality of teeth of the stator, the number of turns of one output winding is N±m, 0, N±m and 0 or is constituted by repetition of the pattern of the number of turns of N±m, 0, N±m and 0 (m is a positive integer and N>m) and the number of turns of the other output winding is 0, N, 0 and N or is constituted by repetition of this pattern. Thus, since a detecting position error caused by a machining error such as deterioration of roundness of an internal diameter of a stator, or the like can be corrected, there is an effect that a rotation angle detection device with a small detecting position error, that is, high accuracy can be realized. Moreover, although the number of turns of one output winding is unbalanced in its peripheral direction, unbalance is not caused and the output winding has symmetric property in its peripheral direction in this embodiment. Therefore, there is another effect that an error does not increase much with respect to eccentricity.

Sixth Embodiment

The methods of changing the number of turns of output windings from the conventional example to reduce a detecting position error caused by a machining error and realize a highly accurate rotation angle detection device have been described above. In this embodiment, a method of reducing a detecting position error more effectively by adjusting the number of turns more successfully will be described.

A relationship between a detecting position error, which is generated intentionally in order to correct a detecting position error caused by a machining error, and the number of turns of output windings is represented by Expressions (41) and (28) as already calculated. This indicates that a detecting position error of a period of an electrical angle of 180 degrees can be generated intentionally at an amplitude of m/2N in an ideal state without a machining error in the winding specification of the fifth embodiment. That is, if N and m are selected such that an amplitude ε of a detecting position error generated in the conventional winding specification in a state with a machining error and an amplitude of this error to be generated intentionally coincide with each other, the error can be reduced more effectively.

As a specific example, when m is set to 2 in the case in which an error of an amplitude of an electrical angle of 0.38 degree, that is, 0.0066 [rad] is generated when N=158 in the conventional winding specification shown in FIG. 25, an effect of substantially matching an amplitude of a detecting position error to be generated intentionally and an amplitude of a detecting position error caused by a machining error as in the following expression will be considered:

$$\frac{m}{2N} = 0.0063 \approx 0.0066 \text{ [rad]} \tag{46}$$

Figures 20, 21:
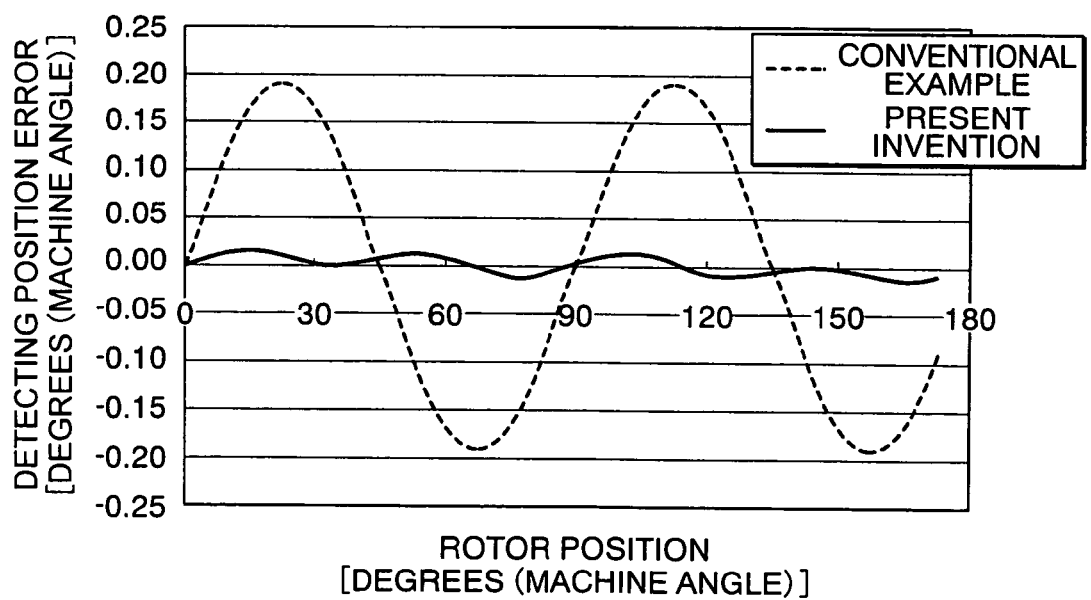
FIG. 20 explains a winding specification of a rotation angle detection device in a sixth embodiment of the present invention in a table format.
FIG. 21 explains comparison of detecting position errors of a conventional example and the sixth embodiment of the present invention by a graph.

A winding specification in this embodiment corresponds to the case in which N=158 and m=2 in FIG. 20. FIG. 21 shows a graph of a detecting position error in this case. It can be said that, according to this embodiment, a detecting position error is reduced more effectively and a more highly accurate rotation angle detection device can be realized compared with the embodiments already described. Although the case in which m/2N and ε are substantially equal is described here, it is needless to mention that an error can be further reduced in the following case:

$$\frac{m}{2N} = \varepsilon \tag{47}$$

As described above, in a rotation angle detection device in which a detecting position error is generated at an electrical angle of ε [rad] in the case of the winding specification of the conventional example, N and m are set such that m/2N and ε are substantially equal, preferably m/2N=ε, in order to correct the error. Thus, a detecting position error caused by a machining error such as deterioration of roundness of an internal diameter of a stator can be corrected. Therefore, since an amplitude of an error to be generated intentionally for reduction of an error and an amplitude of an error caused by a machining error can be made substantially equal or equal, there is an effect that a detecting position error can be reduced more effectively, and a highly accurate rotation angle detection device can be realized.

Seventh Embodiment

In the above-mentioned embodiments, a shape of a rotor is not specifically limited. However, even if a detecting position error caused by a machining error can be reduced by the windings of the present invention, the detecting position error may increase if a shape of a rotor is not appropriate. The present invention relates to a rotation angle detection device that utilizes a component of variation in permeance caused by a shape of a rotor, and a detecting position error decreases if the component of variation in permeance has a sine wave shape and the rotation angle detection device becomes highly accurate.

Therefore, when an angle having a center of a rotation shaft of a rotor as the origin and representing a position on an external circumference of the rotor is θ, if permeance between an internal circumference of a stator and the external circumference of the rotor is as follows including a direct current component in the angle θ, the rotation angle detection device functions as a highly accurate rotation angle detection device:

$$A+B\cos(M\theta) \tag{48}$$

provided that A and B are positive constants and A>B, and M is a shaft multiple angle of the rotation angle detection device. If the shape of the rotor is set such that a gap length in the position of the angle θ is as follows from the fact that the gap length is in inverse proportion to permeance and from Expression (31), a pulsation component of permeance of the gap takes a sine wave shape, and a highly accurate rotation angle detection device can be realized:

$$\frac{1}{A + B\cos(M\theta)} \quad (49)$$

Therefore, there is an effect that a detecting position error can be further reduced and a highly accurate rotation angle detection device can be realized by setting the number of turns of output windings as described in any of the first to sixth embodiments and forming the rotor in a shape determined by Expression (49).

Eighth Embodiment

Figure 22:
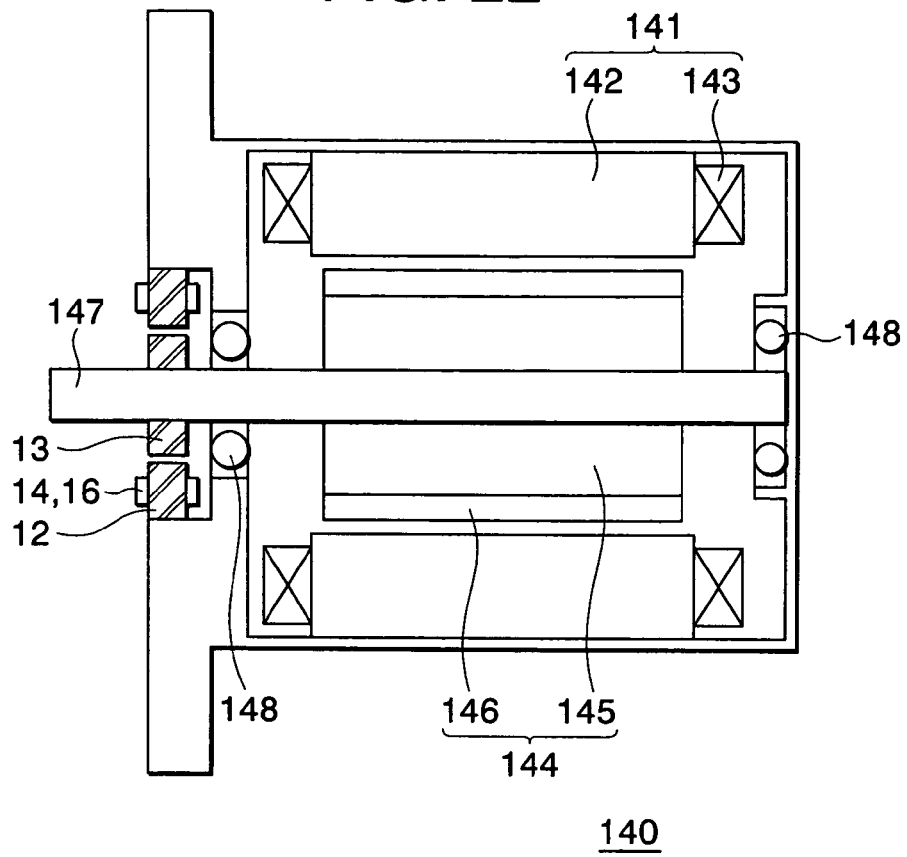
FIG. 22 is a schematic diagram showing a structure of a permanent magnet type dynamo-electric machine in an eighth embodiment of the present invention.

FIG. 22 shows a permanent magnet type dynamo-electric machine provided with the above-mentioned rotation angle detection device of the present invention. In FIG. 22, reference numeral 140 denotes a permanent magnet type dynamo-electric machine; 141, a stator of the dynamo-electric machine 140; 142, an armature core constituting the stator 141; 143, an armature winding also constituting the stator 141; 144, a rotor of the dynamo-electric machine; 145, a rotor core constituting the rotor 144; 146, a permanent magnet also constituting the rotor 144; and 147, a shaft to which the rotor core 145 is fixed. Further, reference numerals 12, 13 and 14 denote the same parts as described above, that is, the stator, the rotor and the output winding of the rotation angle detection device. Although reference numeral 14 in the first embodiment is used for the output winding, the output winding is not limited to this and may be the output winding of any of the above-mentioned embodiment. In addition, reference numeral 16 denotes an excitation winding of the rotation angle detection device.

This permanent magnet type dynamo-electric machine is provided with the stator 141, which is constituted by the armature core 142 and the armature winding 143 contained in the armature core 142, and the rotor 144, which is constituted by the rotor core 145 and the permanent magnet 146. The rotor 144 is fixed to the shaft 147. The rotor 144 can rotate freely by a bearing 148.

In the rotation angle detection device described in the first to seventh embodiment, the rotor 144 is fixed to the shaft 147 by, for example, press-in. The rotation angle detection device is fixed to the stator 141 side of the permanent magnet type dynamo-electric machine 140 around the rotor 144 in a position covered by the stator 141. The rotor 13 of the rotation angle detection device rotates with the rotor 144 of the permanent magnet type dynamo-electric machine 140. When an excitation current is applied to the excitation winding of the rotation angle detection device, a voltage is generated in the output winding, and the rotation angle detection device reads a change in the voltage to detect a rotation angle.

In the first to seventh embodiments, the methods of correcting a detecting position error caused by a machining error to make a rotation angle detection device highly accurate have been described. If the rotation angle detection device to which the technique of the present invention is applied is used for an application for detecting a rotation angle of the rotor 144 of the permanent magnet type dynamo-electric machine 140 as shown in FIG. 22, there is an effect that the rotation angle detection device reduces a detecting position error caused by a machining error and positioning accuracy of the rotor 144 of the permanent magnet type dynamo-electric machine 140 is improved because the rotation angle detection device is made highly accurate.

In addition, if a detecting position error is large, a position of the rotor 144 of the permanent magnet type dynamo-electric machine 140 cannot be grasped accurately. Thus, since a phase of an electric current deviates from a phase that should be energized, a difference occurs between a torque command value and a torque actually generated. As it is seen from the above-mentioned examples, since a detecting position error of a rotation angle detection device changes periodically according to a rotation angle, a torque value also pulsates in accordance with it. That is, when a detecting position error of the rotation angle detection device is large, torque pulsation increases, which lowers the performance of the permanent magnet type dynamo-electric machine 140. Thus, if the rotation angle detection devices described in the first to seventh embodiments are used, since a detecting position error is reduced, there is an effect that the permanent magnet type dynamo-electric machine 140 can be driven with small torque pulsation. In addition, since an optical encoder or the like that is complicated in its structure and expensive is not used, there is another effect that a permanent magnet type dynamo-electric machine can be realized which is simple in its structure, inexpensive and excellent in environment resistance.

The example in which the rotation angle detection device is arranged on a load side of the permanent magnet type dynamo-electric machine is described in this embodiment. It is needless to mention that the same effect can be realized in the case in which the rotation angle detection device is arranged in the opposite direction of load or in the case in which the rotation angle detection device is arranged inside the dynamo-electric machine.

Ninth Embodiment

Figure 23:
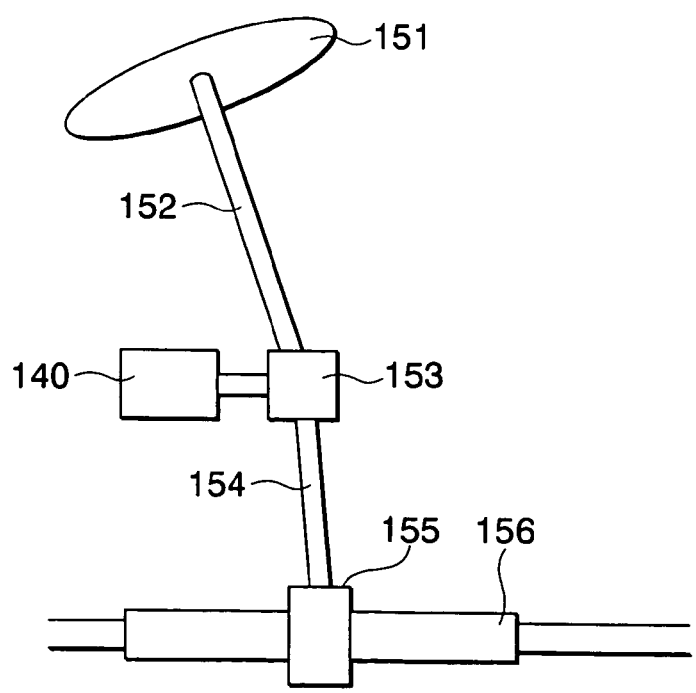
FIG. 23 is schematic diagram showing a structure of an electric power steering in a ninth embodiment of the present invention.

In addition, the permanent magnet type dynamo-electric machine described in the eighth embodiment is suitable for an application in which torque pulsation of a motor used as a driving source is required to be small as in an electric power steering device. FIG. 23 shows a conceptual view of an electric power steering device. In FIG. 23, reference numeral 140 denotes the permanent magnet type dynamo-electric machine described in the eighth embodiment. In addition, reference numeral 151 denotes a steering wheel; 152, a column shaft; 153, a worm gear; 154, a handle joint; 155, a steering gear; and 156, a rack.

A steering force is transmitted from the steering wheel 151 to the worm gear 153 (only a gear box is shown and the worm gear is not shown in the figure) via the column shaft 152. This worm gear 153 transmits a motor output (torque, the number of rotations) while changing its rotation direction at right angles, decelerates the motor simultaneously and increases an assist torque. Moreover, the steering force is transmitted through the handle joint 154 and its direction is also changed. The steering gear 155 (only a gear box is shown and the steering gear is not shown in the figure) decelerates the rotation of the column shaft 152, converts the rotation of the rack 156 into a linear motion simultaneously and obtains a required displacement. Wheels are moved by this linear motion of the rack 156, whereby a car can be turned around.

In the above-mentioned electric power steering device, pulsation of a torque generated by the motor is transmitted to the steering wheel 151 via the worm gear 153 and the column shaft 152. Therefore, if the motor generates large torque pulsation, smooth steering feeling cannot be realized.

In addition, since an optical encoder or the like that is complicated in its structure and expensive is not used, there is another effect that an electric power steering device can be realized which is simple in its structure, inexpensive and excellent in environment resistance.

In addition, although the electric power steering device of a column assist system for assisting a column shaft by a torque of a motor is described in this embodiment, it is needless to mention that the present invention may be applied to an electric power steering device of a rack assist system for assisting a rack by a torque of a motor.

Therefore, the electric power steering device having the permanent magnet type dynamo-electric machine described in the eighth embodiment as a driving source has an effect that pulsation of a torque is small and smooth steering feeling can be realized.

The present invention relates to a rotation angle detection device, including: a stator, which is provided with an excitation winding of one phase and two-phase output windings; and a rotor having salient poles, in which the stator has a plurality of teeth and the two-phase output windings are wound around the plurality of teeth and in which the plurality of teeth include teeth for which the number of turns of the output windings is N and at least one of teeth for which the number of turns of the output windings is N±m (N and m are positive integers and N>m) and teeth for which the number of turns is m. Thus, with such a structure, since a detecting position error caused by a machining error such as deterioration of roundness of an internal diameter of the stator can be corrected, there is an effect that a rotation angle detection device with a small detecting position error, that is, high accuracy can be realized.

In addition, the present invention is a rotation angle detection device consisting of a stator, which is provided with an excitation winding of one phase and two-phase output windings, and a rotor having salient poles, in which the stator has a plurality of teeth, the two-phase output windings are wound around the plurality of teeth such that the number of turns in each tooth of a predetermined one-phase output winding among the two-phase output windings is N±m, 0, N and 0 (it is assumed that N and m are positive integers and N>m) or this pattern of the number of turns is repeated and the number of turns in each tooth of another one-phase output winding among the two-phase output windings is 0, N, 0 and N or this pattern of the number of turns is repeated. Thus, with such a structure, since a detecting position error caused by a machining error such as deterioration of roundness of an internal diameter of the stator can be corrected, there is an effect that a rotation angle detection device with a small detecting position error, that is, high accuracy can be realized. Moreover, since a phase and an amplitude of a detecting position error to be generated intentionally in order to correct an error can be controlled, there is an effect that a detecting position error can be reduced effectively and a highly accurate rotation angle detection device can be realized.

In addition, the present invention relates to a rotation angle detection device, including: a stator, which is provided with an excitation winding of one phase and two-phase output windings; and a rotor having salient poles, in which the stator has a plurality of teeth and the two-phase output windings are wound around the plurality of teeth such that the number of turns in each tooth of the output winding of a predetermined one phase among the two-phase output windings is N, 0, N±$m_1$, and 0 (it is assumed that N and $m_1$ are positive integers and N>$m_1$) or this pattern of the number of turns is repeated and such that the number of turns in each tooth of the output winding of the other phase among the two-phase output windings is 0, N±$m_2$, 0 and N (it is assumed that N and $m_2$ are positive integers and N>$m_2$) or this pattern of the number of turns is repeated. Thus, with such a structure, since a detecting position error caused by a machining error such as deterioration of roundness of an internal diameter of the stator can be corrected, there is an effect that a rotation angle detection device with a small detecting position error, that is, high accuracy can be realized. Moreover, since a phase and an amplitude of a detecting position error to be generated intentionally in order to correct an error can be arbitrarily controlled, there is an effect that a detecting position error can be reduced effectively and a highly accurate rotation angle detection device can be realized.

In addition, the present invention relates to a rotation angle detection device, including: a stator, which is provided with an excitation winding of one phase and two-phase output windings; and a rotor having salient poles, in which the stator has a plurality of teeth and the two-phase output windings are wound around the plurality of teeth such that in an output winding of a predetermined one phase among the two-phase output windings, at least one pattern is included such that the number of turns in each tooth of the output winding of the other phase is N±m, 0, N±m, and 0 (it is assumed that N and m are positive integers and N>m) and such that the number of turns in each tooth of the output winding among the two-phase output windings is 0, N, 0, and N or this pattern of the number of turns is repeated. Thus, with such a structure, since a detecting position error caused by a machining error such as deterioration of roundness of an internal diameter of the stator can be corrected, there is an effect that a rotation angle detection device with a small detecting position error, that is, high accuracy can be realized.

In addition, the present invention relates to a rotation angle detection device, including; a stator, which is provided with an excitation winding of one phase and two-phase output windings; and a rotor having salient poles, in which the stator has a plurality of teeth and the two-phase output windings are wound around the plurality of teeth such that the number of turns in each tooth of the output winding of a predetermined one phase among the two-phase output windings is N±m, 0, N±m, and 0 (it is assumed that N and m are positive integers and N>m) or this pattern of the number of turns is repeated and such that the number of turns in each tooth of the output winding of the other phase among the two-phase output windings is 0, N, 0 and N or this pattern of the number of turns is repeated. Thus, with such a structure, since a detecting position error caused by a machining error such as deterioration of roundness of an internal diameter of the stator can be corrected, there is an effect that a rotation angle detection device with a small detecting position error, that is, high accuracy can be realized. Moreover, there is another effect that an error does not increase much with respect to eccentricity.

In addition, in the case of the winding specification in which m is set to zero, a rotation angle detection device in which a detecting position error occurs by $\epsilon$ [rad] in an electrical angle, m/2N and $\epsilon$ are set substantially equal, preferably m/2N=$\epsilon$, in order to correct the error. With such a structure, since a detecting position error caused by a machining error such as deterioration of roundness of an internal diameter of a stator can be corrected, there is an effect that a rotation angle detection device with a small detecting position error, that is, high accuracy can be realized. Moreover, since an amplitude of an error to be generated intentionally for reduction of an error and an amplitude of an error caused by a machining error can be made substantially equal or equal, there is an effect that a detecting position error can be reduced more effectively.

In addition, when an angle having a center of a rotation shaft of the rotor as the origin and representing a position on an external circumference of the rotor is □, there is provided a rotor whose gap length in the position of the angle □ is $1/\{A+B \cos(M\square)\}$ (provided that A and B are positive constants and A>B and M is a shaft multiple angle of a rotation angle detection device). Since such a rotor is provided, there is an effect that variation in permeance of a gap takes a sine wave shape and a highly accurate rotation angle detection device can be realized.

Further, since the present invention is a permanent magnet type dynamo-electric machine provided with any one of the above-mentioned rotation angle detection device, a detecting position error caused by a machining error such as deterioration of roundness of an internal diameter of a stator and positional deviation of teeth is corrected. Consequently, there is an effect that positioning accuracy is improved by using a rotation angle detection device with a small detecting position error, that is, high accuracy as a rotation position sensor of a permanent magnet type dynamo-electric machine. In addition, since torque pulsation due to a detecting position error can be reduced, there is an effect that a smooth torque waveform can be obtained. Since an optical encoder or the like that is complicated in its structure and expensive is not used, there is another effect that a permanent magnet type dynamo-electric machine that is simple in its structure, inexpensive and excellent in environment resistance can be realized.

Further, since the present invention relates an electric power steering device using, as driving source, the permanent magnet type dynamo-electric machine provided with the above-mentioned rotation angle detection device with a small detecting position error, i.e., with high accuracy, which is achieved by correcting a detecting position error caused by a machining error such as deterioration of roundness of an internal diameter of a stator and positional deviation of teeth. Torque pulsation of the above permanent magnet type dynamo-electric machine is small, whereby there is an effect that smooth steering feeling can be obtained. Since an optical encoder or the like that is complicated in its structure and expensive is not used, there is another effect that an electric power steering device that is simple in its structure, inexpensive and excellent in environment resistance can be realized.

What is claimed is:

1. A rotation angle detection device comprising:
a stator provided with an excitation winding of one phase and two-phase output windings; and
a rotor having salient poles,
wherein said stator has a plurality of teeth and said two-phase output windings are wound around said plurality of teeth such that the number of turns in each tooth of the output winding of a predetermined one phase among said two-phase output windings is N±m, 0, N and 0 (N and m are positive integers and N>m) or this pattern of the number of turns is repeated and such that the number of turns in each tooth of the output winding of the other phase among said two-phase output windings is 0, N, 0 and N or this pattern of the number of turns is repeated.

2. A rotation angle detection device according to claim 1, further comprising a rotor whose gap length in the position of an angle θ is $1/\{A+B \cos(M\theta)\}$ (provided that A and B are positive constants and A>B and M is a shaft multiple angle of a rotation angle detection device), where θ is an angle having a center of a rotation shaft of said rotor as the origin and representing a position on an external circumference of said rotor.

3. A permanent magnet type dynamo-electric machine comprising a rotation angle detection device according to claim 1.

4. An electric power steering device, the electric power steering device using a permanent magnet type dynamo-electric machine according to claim 3 as a driving source.

5. A rotation angle detection device according to claim 1, wherein said two-phase output windings are wound around said plurality of teeth such that the number of turns in each tooth of the output winding of a predetermined one phase among said two-phase output windings is N±m, 0, N and 0 or this pattern of the number of turns is repeated and such that the number of turns in each tooth of the output winding of the other phase among said two-phase output windings is 0, N, 0 and N or this pattern of the number of turns is repeated.

6. A rotation angle detection device according to claim 1, wherein said two-phase output windings are wound around said plurality of teeth such that in an output winding of a predetermined one phase among said two-phase output windings, there is included at least one pattern where the number of turns in each tooth of the output winding is N±m, 0, N±m, and 0 and such that the number of turns in each tooth of the output winding of the other phase among said two-phase output windings is 0, N, 0 and N or this pattern of the number of turns is repeated.

7. A rotation angle detection device according to claim 1, wherein said two-phase output windings are wound around said plurality of teeth such that the number of turns in each tooth of the output winding of a predetermined one phase among said two-phase output windings is N±m, 0, N±m and 0 (N and m are positive integers and N>m) or this pattern of the number of turns is repeated and such that the number of turns in each tooth of the output winding of the other phase among said two-phase output windings is 0, N, 0 and N or this pattern of the number of turns is repeated.

8. A rotation angle detection device according to claim 7, wherein, if the m is set to zero, a detecting position error occurs by $\epsilon$ in an electrical angle, and
wherein $m/2N$ and $\epsilon$ are set to be substantially equal, preferably $M/2N=\epsilon$, in order to correct the error.

9. A rotation angle detection device comprising:
a stator provided with an excitation winding of one phase and two-phase output windings; and
a rotor having salient poles,
wherein said stator has a plurality of teeth and said two-phase output windings are wound around said plurality of teeth such that the number of turns in each tooth of the output winding of a predetermined one phase among said two-phase output windings is N, 0, N±m₁, and 0 (N and $m_1$ are positive integers and N>$m_1$) or this pattern of the number of turns is repeated and such that the number of turns in each tooth of the output winding of the other phase among said two-phase output windings is 0, N±m₂, 0 and N (N and $m_2$ are positive integers and N>$m_2$) or this pattern of the number of turns is repeated.

10. A rotation angle detection device comprising:
a stator provided with an excitation winding of one phase and two-phase output windings; and a rotor having salient poles, wherein said stator has a plurality of teeth and said two-phase output windings are wound around said plurality of teeth such that in an output winding of a predetermined one phase among said two-phase output windings, there is included at least one pattern where the number of turns in each tooth of the output winding is N±m, 0, N±m, and 0 (N and m are positive integers and N>m) and such that the number of turns in each tooth of the output winding of the other phase among said two-phase output windings is 0, N, 0 and N or this pattern of the number of turns is repeated.

11. A rotation angle detection device comprising:

a stator provided with an excitation winding of one phase and two-phase output windings; and a rotor having salient poles, wherein said stator has a plurality of teeth and said two-phase output windings are wound around said plurality of teeth such that the number of turns in each tooth of the output winding of a predetermined one phase among said two-phase output windings is N±m, 0, N±m and 0 (N and m are positive integers and N>m) or this pattern of the number of turns is repeated and such that the number of turns in each tooth of the output winding of the other phase among said two-phase output windings is 0, N, 0 and N or this pattern of the number of turns is repeated.

12. A rotation angle detection device according to claim 11, wherein, if the m is set to zero, a detecting position error occurs by $\epsilon$ in an electrical angle, and wherein $m/2N$ and $\epsilon$ are set to be substantially equal, preferably $m/2N=\epsilon$, in order to correct the error.

* * * * *